United States Patent
Sun et al.

(10) Patent No.: US 10,785,678 B2
(45) Date of Patent: Sep. 22, 2020

(54) CONGESTION CONTROL METHOD, BASE STATION, AND USER EQUIPMENT

(71) Applicant: HUAWEI TECHNOLOGIES CO., LTD., Shenzhen, Guangdong (CN)

(72) Inventors: Jizhong Sun, Xi'an (CN); Liang Chen, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/251,936

(22) Filed: Jan. 18, 2019

(65) Prior Publication Data
US 2019/0174349 A1 Jun. 6, 2019

Related U.S. Application Data

(63) Continuation of application No. PCT/CN2016/091093, filed on Jul. 22, 2016.

(51) Int. Cl.
*H04W 28/02* (2009.01)
*H04W 76/27* (2018.01)
(Continued)

(52) U.S. Cl.
CPC ....... *H04W 28/0289* (2013.01); *H04W 24/10* (2013.01); *H04W 28/0205* (2013.01);
(Continued)

(58) Field of Classification Search
CPC ..... H04W 28/02; H04W 28/06; H04W 28/16; H04W 72/12; H04W 28/0289; H04W 76/27; H04W 72/0486; H04W 72/042
See application file for complete search history.

(56) References Cited

U.S. PATENT DOCUMENTS

2011/0199991 A1* 8/2011 Harris ............... H04W 72/1263
370/329
2013/0111061 A1 5/2013 Song
(Continued)

FOREIGN PATENT DOCUMENTS

CN 102281183 A 12/2011
CN 104168601 A 11/2014
(Continued)

OTHER PUBLICATIONS

Extended European Search Report issued in European Application No. 16909287.1 dated May 16, 2019, 10 pages.
(Continued)

*Primary Examiner* — Chi Ho A Lee
(74) *Attorney, Agent, or Firm* — Fish & Richardson P.C.

(57) ABSTRACT

Embodiments of the present disclosure provide example congestion control methods, base stations, and user equipment. After determining that congestion control needs to be performed, a base station determines a congestion control policy, and determines, from UE in coverage of the base station, first UE that needs to perform adjustment according to the congestion control policy. The base station can then send the congestion control policy to the first UE, so that the first UE performs adjustment, to alleviate a congestion status of a PC5 interface. In this process, the base station performs centralized control on all UE in the coverage of the base station.

19 Claims, 8 Drawing Sheets

(51) Int. Cl.
- *H04W 24/10* (2009.01)
- *H04W 28/06* (2009.01)
- *H04W 28/16* (2009.01)
- *H04W 72/04* (2009.01)
- *H04W 72/12* (2009.01)

(52) U.S. Cl.
CPC ........... *H04W 28/06* (2013.01); *H04W 28/16* (2013.01); *H04W 72/042* (2013.01); *H04W 72/0486* (2013.01); *H04W 72/1257* (2013.01); *H04W 76/27* (2018.02)

(56) References Cited

U.S. PATENT DOCUMENTS

| | | | |
|---|---|---|---|
| 2013/0150108 | A1 | 6/2013 | Yang et al. |
| 2014/0071815 | A1 | 3/2014 | Gu et al. |
| 2014/0316727 | A1* | 10/2014 | Kim .................... H04L 43/0876 702/62 |
| 2015/0236938 | A1* | 8/2015 | Thapliya ............. H04L 43/0894 370/232 |
| 2016/0277987 | A1* | 9/2016 | Chen .................... H04L 5/0085 |
| 2018/0263032 | A1* | 9/2018 | Terry .................... H04W 28/06 |
| 2018/0317066 | A1* | 11/2018 | Xu .......................... H04W 4/06 |
| 2019/0045524 | A1* | 2/2019 | Pettersson ............. H04W 72/14 |
| 2019/0141573 | A1* | 5/2019 | Bostrom ............... H04W 28/08 |
| 2019/0387429 | A1* | 12/2019 | Basu Mallick ....... H04W 36/03 |

FOREIGN PATENT DOCUMENTS

| | | |
|---|---|---|
| CN | 104918283 A | 9/2015 |
| CN | 105357715 A | 2/2016 |
| CN | 105517054 A | 4/2016 |
| EP | 3116274 A1 | 1/2017 |
| EP | 3182646 A1 | 6/2017 |
| WO | 2013063832 A1 | 5/2013 |
| WO | 2014117810 A1 | 8/2014 |
| WO | 2015058406 A1 | 4/2015 |
| WO | 2015131544 A1 | 9/2015 |
| WO | 2016033742 A1 | 3/2016 |

OTHER PUBLICATIONS

S1-152079—Intel Corporation et al., "Use Case for MNO Configuration of V2X Message Transmission Characteristics," 3GPP TSG-SA WG1 Meeting #71, Belgrade, Serbia, Aug. 17-21, 2015, 4 pages.

R1-164467 Guangdong OPPO Mobile Telecom,"UE sensing based congestion control for mode-2",3GPP TSG RAN WG1 Meeting #85,Nanjing, China, May 23-27, 2016,total 1 pages.

R2-163808 Huawei, HiSilicon,"Congestion Control for Uu and PC5 based V2X transmission",3GPP TSG-RAN WG2 Meeting #94,Nanjing, China, May 23-27, 2016,total 4 pages.

International Search Report and Written Opinion issued in International Application No. PCT/CN2016/091093 dated Mar. 1, 2017, 16 pages.

\* cited by examiner

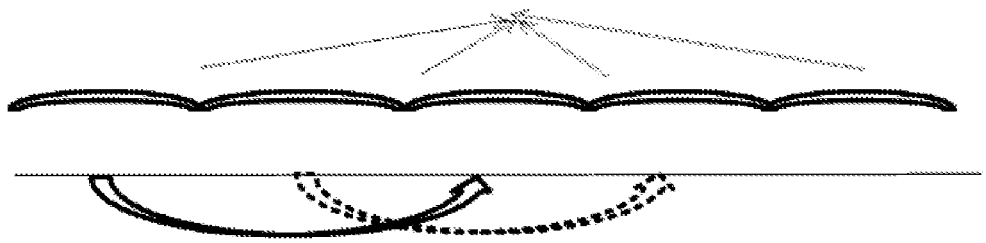

Packet transmission period = 100 ms

First packet transmission period = 200 ms, to be specific, the first packet transmission period = a quantity of first VUE x the packet transmission period, and the quantity of first VUE is 2

FIG. 4A

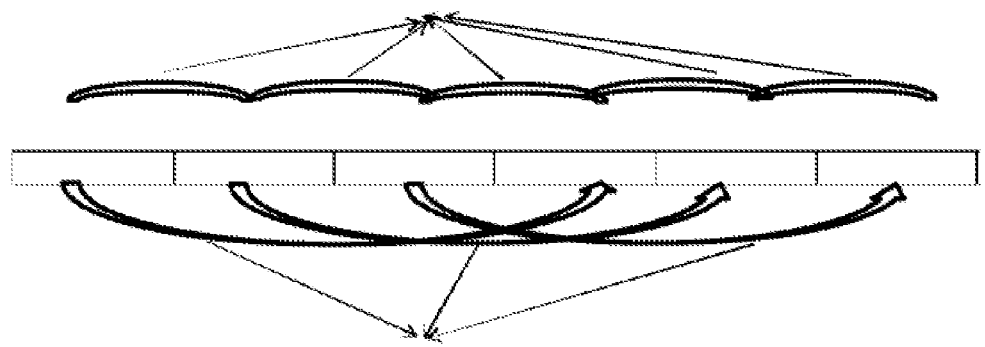

Packet transmission period = 100 ms

First packet transmission period = 300 ms, to be specific, the first packet transmission period = a quantity of first VUE x the packet transmission period, and the quantity of first VUE is 3

FIG. 4B

First packet transmission period = 200 ms, obtained by performing adjustment to twice greater than a minimum packet transmission period First packet transmission period = 300 ms, obtained by performing adjustment to three times greater than a minimum packet transmission period

CONGESTION CONTROL METHOD, BASE STATION, AND USER EQUIPMENT

CROSS-REFERENCE TO RELATED APPLICATIONS

This application is a continuation of International Application No. PCT/CN2016/091093, filed on Jul. 22, 2016, the disclosure of which is hereby incorporated by reference in its entirety.

TECHNICAL FIELD

Embodiments of the present invention relate to intelligent communication technologies, and in particular, to a congestion control method, a base station, and user equipment.

BACKGROUND

As communication technologies develop, device-to-device (D2D) communication, for example, vehicle-to-everything (V2X) communication, is widely applied. The V2X communication includes vehicle-to-vehicle (V2V) communication, vehicle-to-infrastructure (V2I) communication, vehicle-to-pedestrian (V2P) communication, and the like.

In an existing vehicle-to-vehicle communications technology, a decentralized congestion control mechanism in 802.11P is used. VUE uses a carrier sense multiple access/collision detection (CSMA/CD) mechanism to listen to whether a channel is "busy" or "idle", to back off or allocate a resource.

In the V2X communication, external communication is performed by vehicle user equipment (VUE) on an LTE frequency band or a dedicated frequency band, to connect the VUE to VUE, a road, a pedestrian, and the like, and to implement traffic coordination assistance with high security. In an urban area scenario or a scenario in which VUE is relatively densely distributed, a resource pool capacity is limited, causing an excessively long service packet transmission time between VUEs, and quite large interference between the VUEs when service packets are sent. Consequently, a packet delivery ratio (PDR) of a service packet of the VUE is decreased, and eventually, a security assistance effect of a vehicle is limited.

SUMMARY

Embodiments of the present invention provide a congestion control method, a base station, and user equipment, to improve a security assistance effect of a vehicle through congestion control.

According to a first aspect, an embodiment of the present invention provides a congestion control method, where the method is described from a perspective of a base station. In the method, after determining that congestion control needs to be performed, the base station determines a congestion control policy, determines, from UE in coverage of the base station, first UE that needs to perform adjustment according to the congestion control policy, and then sends the congestion control policy to the first UE, so that the first UE performs adjustment, to alleviate a congestion status of a PC5 interface.

According to this method, the base station performs centralized control on all UE in the coverage of the base station. This resolves a problem of a poor security assistance effect caused by a decentralized congestion control policy in 802.11P. In other words, the base station performs centralized congestion control, improving a security assistance effect of a vehicle.

In a feasible implementation, the determining, by the base station, to perform congestion control on UE in coverage of the base station is specifically: determining, by the base station, whether a quantity of transmission times of the UE in the coverage of the base station meets a preset quantity of transmission times; if the preset quantity of transmission times is met, determining whether the UE in the coverage of the base station meets a congestion control condition; and if the congestion control condition is met, determining to perform congestion control on the UE in the coverage of the base station.

In the foregoing method, the base station determines a quantity of transmission times and utilization of a resource pool, and determines, based on a determining result, whether to trigger the base station to perform centralized congestion control, to avoid congestion control blindness.

In a feasible implementation, the congestion control condition includes a first condition and/or a second condition; under the first condition, a sum of resource requirements of the UE in the coverage of the base station is greater than resources that can be used for direct communication between UEs in the UE in the coverage of the base station; and under the second condition, a transmission delay of at least one of the UE in the coverage of the base station is greater than a congestion control delay threshold.

In a feasible implementation, the congestion control policy is specifically used to instruct the first UE to perform adjustment in a measurement period, the measurement period includes Q resource pool scheduling allocation periods, a $Qi^{th}$ resource pool scheduling allocation period is any one of the Q resource pool scheduling allocation periods, $Q \geq 1$, $1 \leq Qi \leq Q$, and both Q and Qi are integers.

In the foregoing method, the base station specifically performs congestion control on the UE in the coverage in each measurement period, and even in a resource pool scheduling allocation period of each measurement period, to implement fine-grained centralized congestion control.

In a feasible implementation, the congestion control policy is specifically used to instruct the first UE to adjust a current packet transmission period to a first packet transmission period in the measurement period, and the determining, by the base station, a congestion control policy is specifically: determining, by the base station, the first packet transmission period based on a quantity of UE that is authorized for scheduling in a scheduling queue and a quantity of UE that is unauthorized for scheduling in the scheduling queue, where the first packet transmission period is greater than the current packet transmission period, and UE in the scheduling queue is UE corresponding to the measurement period; and determining, by the base station, a quantity of the first UE for the $Qi^{th}$ resource pool scheduling allocation period based on a quantity of UE that is authorized for scheduling in the scheduling queue, a quantity of UE that is unauthorized for scheduling in the scheduling queue, and a quantity of UE whose transmission delay is greater than the congestion control delay threshold.

In the foregoing method, the base station adjusts a packet transmission period of UE in the measurement period, to implement congestion control.

In a feasible implementation, the base station determines that resource utilization in the $Qi^{th}$ resource pool scheduling allocation period is less than a resource utilization threshold of congestion control; the base station determines a second packet transmission period, where the second packet transmission period is less than a current packet transmission period of second UE; the base station determines the second UE from the scheduling queue, where the second UE is UE with a high priority in the scheduling queue; and the base station sends indication information to the second UE, to instruct the second UE to adjust the current packet transmission period to the second packet transmission period.

In the foregoing method, when utilization of a resource pool is less than the utilization threshold of congestion control, a packet transmission period is decreased, to improve utilization of a resource in the resource pool.

In a feasible implementation, the congestion control policy is specifically used to instruct the first UE to adjust a current packet transmission period to a first packet transmission period in the measurement period, and the determining, by the base station, a congestion control policy includes:

determining, by the base station, the first packet transmission period and a quantity of the first UE for the $Qi^{th}$ resource pool scheduling allocation period, where the first packet transmission period is an integral multiple of a packet transmission period of UE whose packet transmission period is minimum in the $Qi^{th}$ resource pool scheduling allocation period.

In the foregoing method, the base station adjusts a packet transmission period of UE in each resource pool scheduling allocation period, to implement fine-grained centralized congestion control.

In a feasible implementation, the base station determines that resource utilization in the $Qi^{th}$ resource pool scheduling allocation period is less than a resource utilization threshold of congestion control;

the base station determines a second packet transmission period, where the second packet transmission period is less than a current packet transmission period of second UE;

the base station determines the second UE from a scheduling queue, where the second UE is UE with a high priority in the scheduling queue; and the base station sends indication information to the second UE, to instruct the second UE to adjust the current packet transmission period to the second packet transmission period.

In the foregoing method, when utilization of a resource pool is less than the utilization threshold of congestion control, a packet transmission period is decreased, to improve utilization of a resource in the resource pool.

In a feasible implementation, the congestion control policy is specifically used to instruct the base station to determine, based on a quantity of first UE whose transmission delay is greater than the congestion control delay threshold in a current measurement period, a quantity of first UE whose transmission delay is greater than the congestion control delay threshold in a next measurement period, and the determining, by the base station, a congestion control policy is specifically: determining, by the base station, a first quantity for a $Qi^{th}$ resource pool scheduling allocation period of the current measurement period, where the first quantity is a quantity of first UE whose transmission delay is greater than the congestion control delay threshold in the $Qi^{th}$ resource pool scheduling allocation period of the current measurement period; and determining, by the base station, a second quantity for a $Qi^{th}$ resource pool scheduling allocation period of the next measurement period based on the first quantity, where the second quantity is a final quantity of first UE whose transmission delay is greater than the congestion control delay threshold in the $Qi^{th}$ resource pool scheduling allocation period of the next measurement period.

In the foregoing method, the base station determines, based on a quantity of UE whose transmission delay is greater than the congestion control delay threshold in a previous measurement period, a quantity of UE whose transmission delay is greater than the congestion control delay threshold in the current measurement period, and further performs alternate packet discarding processing for the current measurement period in advance, to improve a congestion control effect.

In a feasible implementation, the determining, by the base station, a second quantity based on the first quantity includes:

determining, by the base station, an original quantity for the $Qi^{th}$ resource pool scheduling allocation period of the next measurement period, where the original quantity is an original quantity of first UE whose transmission delay is greater than the congestion control delay threshold in the $Qi^{th}$ resource pool scheduling allocation period of the next measurement period, and the second quantity is equal to a sum of the first quantity and the original quantity.

In a feasible implementation, the base station determines that resource utilization in the $Qi^{th}$ resource pool scheduling allocation period of the measurement period is less than a resource utilization threshold of congestion control, and the base station decreases the first quantity.

In the foregoing method, when utilization of a resource pool is less than the utilization threshold of congestion control, a quantity of UE that discards a packet is decreased, to improve the utilization of the resource pool.

In a feasible implementation, the base station instructs the second quantity of first UE to alternately serve as UE whose transmission delay is greater than the congestion control delay threshold.

In a feasible implementation, the base station determines that handed-over UE or new accessing UE serves as the first UE, where a quantity of times that the handed-over UE or the new accessing UE serves as the first UE is a maximum or an average quantity of times that the second quantity of UE serves as the first UE.

In the foregoing method, a value is assigned to a quantity of times that the handed-over UE or the new accessing UE discards a packet, to avoid that the handed-over UE or the new accessing UE discards an excessive quantity of packets.

In a feasible implementation, the congestion control policy is specifically used to instruct the first UE to send a service packet by using a Uu interface, and the Uu interface is an air interface used for wireless communication between the base station and the first UE.

In the foregoing method, UE is instructed to send a service packet by using a Uu interface, to alleviate a congestion status of a PC5 interface.

In a feasible implementation, the congestion control policy is specifically used to instruct the first UE to adjust transmit power, or perform adaptive modulation and coding AMC or multicarrier load balancing.

In the foregoing method, the base station instructs UE to adjust transmit power, or perform AMC adaptation, load balancing, or the like, to implement congestion control.

In a feasible implementation, the sending, by the base station, indication information to the first UE includes: sending, by the base station, the indication information to the first UE by using downlink control information DCI or radio resource control RRC signaling.

In a feasible implementation, the congestion control policy is specifically used to instruct the first UE to adjust a current packet transmission period to a first packet transmission period in the measurement period, and the determining, by the base station, a congestion control policy includes: determining, by the base station, to adjust a current packet transmission period of each UE in the coverage of the base station to the first packet transmission period; and sending, by the base station, indication information to the first UE includes:

sending, by the base station, the indication information to the first UE by using a system information block SIB, where the first UE is any UE in the coverage of the base station.

In the foregoing method, the base station sends the congestion control policy to UE by using a SIB, so that the UE in the coverage of the base station adjusts packet transmission periods to the same first packet transmission period.

In a feasible implementation, the base station receives congestion status information, reported by UE included in the scheduling queue, of a PC5 interface; and determining, by the base station, the first UE from the UE included in the scheduling queue includes:

determining, by the base station based on the congestion status information of the PC5 interface, the first UE from the UE included in the scheduling queue.

According to a second aspect, an embodiment of the present invention provides a congestion control method, where the method is described from a perspective of user equipment. In the method, first user equipment UE receives indication information sent by a base station, and then performs adjustment based on a congestion control policy, to alleviate a congestion status of a PC5 interface, where the congestion control policy is determined by the base station after the base station determines that congestion control needs to be performed on UE in coverage of the base station.

In the foregoing method, the indication information that carries the congestion control policy and that is sent by the base station is received, and adjustment is performed according to the congestion control policy, to alleviate the congestion status of the PC5 interface. In this process, the base station performs centralized control on all UE in the coverage of the base station. This resolves a problem of a poor security assistance effect caused by a decentralized congestion control policy in 802.11P. In other words, the base station performs centralized congestion control, improving a security assistance effect of a vehicle.

In a feasible implementation, the first UE sends a scheduling request; and when determining that the base station does not respond to the scheduling request after a timer expires, or determining that the PC5 interface of the first UE is congested, the first UE assists in congestion control.

In the foregoing method, on a basis of centralized congestion control performed by the base station, UE assists in congestion control, to implement congestion control in which the centralized congestion control performed by the base station is primary and UE-assisted congestion control is auxiliary.

In a feasible implementation, the assisting, by the first UE, in congestion control includes at least one of the following behavior:

first behavior: the first UE adjusts a packet transmission period and/or schedules a sending period of an allocation request;

second behavior: the first UE detects whether the timer expires, and requests a resource in a resource contention manner if the timer expires;

third behavior: the first UE sends congestion status information of the PC5 interface to the base station; or fourth behavior: the first UE serves as UE whose transmission delay is greater than a congestion control delay threshold, and the first UE discards a service packet.

In a feasible implementation, the congestion control policy is specifically used to instruct the first UE to perform adjustment in a measurement period, the measurement period includes Q resource pool scheduling allocation periods, a $Qi^{th}$ resource pool scheduling allocation period is any one of the Q resource pool scheduling allocation periods, $Q \geq 1$, $1 \leq Qi \leq Q$, and both Q and Qi are integers.

In a feasible implementation, the congestion control policy is specifically used to instruct the first UE to adjust a current packet transmission period to a first packet transmission period in the measurement period, and the performing, by the first UE, adjustment based on a congestion control policy, to alleviate a congestion status of a PC5 interface includes:

adjusting, by the first UE, the current packet transmission period to the first packet transmission period for the $Qi^{th}$ resource pool scheduling allocation period, where the first packet transmission period is greater than the current packet transmission period.

In a feasible implementation, the first UE adjusts the first packet transmission period to a second packet transmission period, where the second packet transmission period is less than the first packet transmission period.

In a feasible implementation, the first UE receives DCI information sent by the base station, where the DCI information is used to instruct the first UE to serve as UE whose transmission delay is greater than a congestion control delay threshold.

In a feasible implementation, the first UE determines whether resource utilization in the measurement period is greater than a utilization threshold of congestion control, and sends congestion status information to the base station if the resource utilization is greater than the utilization threshold of congestion control.

In a feasible implementation, the determining, by the first UE, whether resource utilization in the measurement period is greater than a utilization threshold of congestion control includes:

determining, by the first UE, whether energy of each physical resource block PRB at each transmission time interval TTI in the measurement period is greater than an energy detection threshold; and if a ratio of a total quantity of PRBs whose energy is greater than the energy detection threshold of congestion control in the measurement period to a total quantity of PRBs in the measurement period is greater than a preset threshold, determining that utilization of a resource pool is greater than the utilization threshold of congestion control.

In a feasible implementation, the determining, by the first UE, whether resource utilization in the measurement period is greater than a utilization threshold of congestion control includes:

determining, by the first UE, whether average energy of physical resource blocks PRBs in a subband PRB group in the measurement period is greater than an energy detection threshold; and if a ratio of a total quantity of PRBs whose energy is greater than the energy detection threshold of congestion control in the measurement period to a total quantity of PRBs in the measurement period is greater than a preset threshold, determining that utilization of a resource pool is greater than the utilization threshold of congestion control.

In a feasible implementation, the receiving, by first UE, indication information sent by a base station includes:

receiving, by the first UE, the indication information sent by the base station by using downlink control information DCI, radio resource control RRC signaling, or a system information block SIB.

According to a third aspect, an embodiment of the present invention provides a base station, including:

a processing module, configured to: determine to perform congestion control on user equipment UE in coverage of the base station, determine a congestion control policy, and determine first UE from the UE in the coverage of the base station, where the first UE is UE for which congestion needs to be alleviated according to the congestion control policy; and a transceiver module, configured to send indication information to the first UE, where the indication information carries the congestion control policy, so that the first UE performs adjustment according to the congestion control policy.

In a feasible implementation, the processing module is specifically configured to: determine whether a quantity of transmission times of the UE in the coverage of the base station meets a preset quantity of transmission times; if the preset quantity of transmission times is met, determine whether the UE in the coverage of the base station meets a congestion control condition; and if the congestion control condition is met, determine to perform congestion control on the UE in the coverage of the base station.

In a feasible implementation, the congestion control condition includes a first condition and/or a second condition;

under the first condition, a sum of resource requirements of the UE in the coverage of the base station is greater than resources that can be used for direct communication between UEs in the UE in the coverage of the base station; and under the second condition, a transmission delay of at least one of the UE in the coverage of the base station is greater than a congestion control delay threshold.

In a feasible implementation, the congestion control policy is specifically used to instruct the first UE to perform adjustment in a measurement period, the measurement period includes Q resource pool scheduling allocation periods, a $Qi^{th}$ resource pool scheduling allocation period is any one of the Q resource pool scheduling allocation periods, $Q \geq 1$, $1 \leq Qi \leq Q$, and both Q and Qi are integers.

In a feasible implementation, the processing module is specifically configured to: when the congestion control policy is specifically used to instruct the first UE to adjust a current packet transmission period to a first packet transmission period in the measurement period, determine the first packet transmission period based on a quantity of UE that is authorized for scheduling in a scheduling queue and a quantity of UE that is unauthorized for scheduling in the scheduling queue, where the first packet transmission period is greater than the current packet transmission period, and UE in the scheduling queue is UE corresponding to the measurement period; and determine, by the base station, a quantity of the first UE for the $Qi^{th}$ resource pool scheduling allocation period based on a quantity of UE that is authorized for scheduling in the scheduling queue, a quantity of UE that is unauthorized for scheduling in the scheduling queue, and a quantity of UE whose transmission delay is greater than the congestion control delay threshold.

In a feasible implementation, the processing module is further configured to: determine that resource utilization in the $Qi^{th}$ resource pool scheduling allocation period is less than a resource utilization threshold of congestion control; determine a second packet transmission period, where the second packet transmission period is less than a current packet transmission period of second UE; and determine the second UE from the scheduling queue, where the second UE is UE with a high priority in the scheduling queue; and the transceiver module is further configured to send indication information to the second UE, to instruct the second UE to adjust the current packet transmission period to the second packet transmission period.

In a feasible implementation, the processing module is specifically configured to: when the congestion control policy is specifically used to instruct the first UE to adjust a current packet transmission period to a first packet transmission period in the measurement period, determine, by the base station, the first packet transmission period and a quantity of the first UE for the $Qi^{th}$ resource pool scheduling allocation period, where the first packet transmission period is an integral multiple of a packet transmission period of UE whose packet transmission period is minimum in the $Qi^{th}$ resource pool scheduling allocation period.

In a feasible implementation, the processing module is further configured to: determine that resource utilization in the $Qi^{th}$ resource pool scheduling allocation period is less than a resource utilization threshold of congestion control; determine a second packet transmission period, where the second packet transmission period is less than a current packet transmission period of second UE; and determine the second UE from a scheduling queue, where the second UE is UE with a high priority in the scheduling queue; and the transceiver module is further configured to send indication information to the second UE, to instruct the second UE to adjust the current packet transmission period to the second packet transmission period.

In a feasible implementation, the processing module is specifically configured to: when the congestion control policy is specifically used to instruct the base station to determine, based on a quantity of first UE whose transmission delay is greater than the congestion control delay threshold in a current measurement period, a quantity of first UE whose transmission delay is greater than the congestion control delay threshold in a next measurement period, determine, by the base station, a first quantity for a $Qi^{th}$ resource pool scheduling allocation period of the current measurement period, where the first quantity is a quantity of first UE whose transmission delay is greater than the congestion control delay threshold in the $Qi^{th}$ resource pool scheduling allocation period of the current measurement period; and determine, by the base station, a second quantity for a $Qi^{th}$ resource pool scheduling allocation period of the next measurement period based on the first quantity, where the second quantity is a final quantity of first UE whose transmission delay is greater than the congestion control delay threshold in the $Qi^{th}$ resource pool scheduling allocation period of the next measurement period.

In a feasible implementation, the processing module is specifically configured to determine an original quantity for the $Qi^{th}$ resource pool scheduling allocation period of the next measurement period, where the original quantity is an original quantity of first UE whose transmission delay is greater than the congestion control delay threshold in the $Qi^{th}$ resource pool scheduling allocation period of the next measurement period, and the second quantity is equal to a sum of the first quantity and the original quantity.

In a feasible implementation, the processing module is further configured to: determine that resource utilization in the $Qi^{th}$ resource pool scheduling allocation period of the measurement period is less than a resource utilization threshold of congestion control; and decrease the first quantity.

In a feasible implementation, the processing module is further configured to instruct the second quantity of first UE to alternately serve as UE whose transmission delay is greater than the congestion control delay threshold.

In a feasible implementation, the processing module is further configured to determine that handed-over UE or new accessing UE serves as the first UE, where a quantity of times that the handed-over UE or the new accessing UE serves as the first UE is a maximum or an average quantity of times that the second quantity of UE serves as the first UE.

In a feasible implementation, the processing module is further configured to instruct the first UE to send a service packet by using a Uu interface, where the Uu interface is an air interface used for wireless communication between the base station and the first UE.

In a feasible implementation, the congestion control policy is specifically used to instruct the first UE to adjust transmit power, or perform adaptive modulation and coding AMC or multicarrier load balancing.

In a feasible implementation, the transceiver module is specifically configured to send the indication information to the first UE by using downlink control information DCI or radio resource control RRC signaling.

In a feasible implementation, the processing module is specifically configured to: when the congestion control policy is specifically used to instruct the first UE to adjust a current packet transmission period to a first packet transmission period in the measurement period, determine to adjust a current packet transmission period of each UE in the coverage of the base station to the first packet transmission period; and the transceiver module is specifically configured to send the indication information to the first UE by using a system information block SIB, where the first UE is any UE in the coverage of the base station.

In a feasible implementation, the transceiver module is further configured to receive congestion status information, reported by UE included in the scheduling queue, of a PC5 interface; and the processing module is specifically configured to determine, based on the congestion status information of the PC5 interface, the first UE from the UE included in the scheduling queue.

According to a fourth aspect, an embodiment of the present invention provides user equipment, where the user equipment is first user equipment, and the first user equipment includes:

a transceiver module, configured to receive indication information sent by a base station, where the indication information carries a congestion control policy, and the congestion control policy is determined by the base station after the base station determines that congestion control needs to be performed on UE in coverage of the base station; and a processing module, configured to perform adjustment according to the congestion control policy.

In a feasible implementation, the transceiver module is further configured to send a scheduling request; and the processing module is further configured to: when determining that the base station does not respond to the scheduling request after a timer expires, or determining that a PC5 interface of the first UE is congested, assist in congestion control.

In a feasible implementation, the processing module is specifically configured to perform at least one of the following congestion control assistance behavior:

first behavior: adjusting a packet transmission period and/or scheduling a sending period of an allocation request;

second behavior: detecting whether the timer expires and requesting a resource in a resource contention manner if the timer expires;

third behavior: sending congestion status information of the PC5 interface to the base station; or fourth behavior: serving as UE whose transmission delay is greater than a congestion control delay threshold, and discarding, by the first UE, a service packet.

In a feasible implementation, the congestion control policy is specifically used to instruct the first UE to perform adjustment in a measurement period, the measurement period includes Q resource pool scheduling allocation periods, a $Qi^{th}$ resource pool scheduling allocation period is any one of the Q resource pool scheduling allocation periods, $Q \geq 1$, $1 \leq Qi \leq Q$, and both Q and Qi are integers.

In a feasible implementation, the processing module is specifically configured to: when the congestion control policy is specifically used to instruct the first UE to adjust a current packet transmission period to a first packet transmission period in the measurement period, adjust, by the first UE, the current packet transmission period to the first packet transmission period for the $Qi^{th}$ resource pool scheduling allocation period, where the first packet transmission period is greater than the current packet transmission period.

In a feasible implementation, the processing module is further configured to adjust the first packet transmission period to a second packet transmission period, where the second packet transmission period is less than the first packet transmission period.

In a feasible implementation, the transceiver module is specifically configured to receive DCI information sent by the base station, where the DCI information is used to instruct the first UE to serve as UE whose transmission delay is greater than a congestion control delay threshold.

In a feasible implementation, the processing module is further configured to determine whether resource utilization in the measurement period is greater than a utilization threshold of congestion control; and the transceiver module is further configured to send the congestion status information to the base station when the processing module determines that the resource utilization in the measurement period is greater than the utilization threshold of congestion control.

In a feasible implementation, the processing module is specifically configured to: determine whether energy of each physical resource block PRB at each transmission time interval TTI in the measurement period is greater than an energy detection threshold; and if a ratio of a total quantity of PRBs whose energy is greater than the energy detection threshold of congestion control in the measurement period to a total quantity of PRBs in the measurement period is greater than a preset threshold, determine that utilization of a resource pool is greater than the utilization threshold of congestion control.

In a feasible implementation, the processing module is specifically configured to: determine whether average energy of physical resource blocks PRBs in a subband PRB group in the measurement period is greater than an energy detection threshold; and if a ratio of a total quantity of PRBs whose energy is greater than the energy detection threshold of congestion control in the measurement period to a total quantity of PRBs in the measurement period is greater than a preset threshold, determine that utilization of a resource pool is greater than the utilization threshold of congestion control.

In a feasible implementation, the transceiver module is specifically configured to receive the indication information sent by the base station by using downlink control information DCI, radio resource control RRC signaling, or a system information block SIB.

According to a fifth aspect, an embodiment of the present invention provides a base station, including a processor, a memory, a communications interface, and a system bus, where the memory and the communications interface are connected to the processor by using the system bus to complete communication between each other, the memory is configured to store a computer executable instruction, the communications interface is configured to communicate with another device, and the processor is configured to run the computer executable instruction, so that the base station performs all steps of the foregoing method that is applied to the base station.

According to a sixth aspect, an embodiment of the present invention provides user equipment, where the user equipment UE is first UE, and the first UE includes a processor, a memory, a communications interface, and a system bus, the memory and the communications interface are connected to the processor by using the system bus to complete communication between each other, the memory is configured to store a computer executable instruction, the communications interface is configured to communicate with another device, and the processor is configured to run the computer executable instruction, so that the base station performs all steps of the foregoing method that is applied to the user equipment.

According to a seventh aspect, an embodiment of the present invention provides a computer storage medium, configured to store a computer software instruction used by the foregoing base station. The computer software instruction includes a program designed for performing the foregoing aspects.

According to an eighth aspect, an embodiment of the present invention provides a computer storage medium, configured to store a computer software instruction used by the foregoing user equipment. The computer software instruction includes a program designed for performing the foregoing aspects.

According to a ninth aspect, an embodiment of the present invention provides a base station. The base station has a function of implementing behavior of the base station in the foregoing method designs. The function may be implemented by hardware, or may be implemented by hardware by executing corresponding software. The hardware or software includes one or more units corresponding to the function.

In a feasible implementation, a structure of the base station includes a processor and a transmitter, and the processor is configured to support the base station in performing a corresponding function in the foregoing method. The transmitter is configured to: support communication between the base station and user equipment, and send, to the user equipment, information or an instruction used in the foregoing method. The base station may further include a memory. The memory is configured to be coupled to the processor, and stores a program instruction and data that are required by the base station.

According to a tenth aspect, an embodiment of the present invention provides user equipment. The user equipment has a function of implementing behavior of the user equipment in the foregoing method designs. The function may be implemented by hardware, or may be implemented by hardware by executing corresponding software. The hardware or software includes one or more units corresponding to the function. The unit may be software and/or hardware.

In a possible design, a structure of the user equipment includes a receiver and a processor, and the processor is configured to support the user equipment in performing a corresponding function in the foregoing method. The transmitter is configured to: support communication between the user equipment and a base station, and receive information or an instruction that is sent by the base station and that is used in the foregoing method. The user equipment may further include a memory. The memory is configured to be coupled to the processor, and stores a program instruction and data that are required by the user equipment.

According to the congestion control method, the base station, and the user equipment provided in the embodiments of the present invention, after determining that congestion control needs to be performed, the base station determines the congestion control policy, determines, from the UE in the coverage of the base station, the first UE that needs to perform adjustment according to the congestion control policy, and then sends the congestion control policy to the first UE, so that the first UE performs adjustment, to alleviate the congestion status of the PC5 interface. In this process, the base station performs centralized control on all UE in the coverage of the base station. This resolves a problem of a poor security assistance effect caused by a decentralized congestion control policy in 802.11P. In other words, the base station performs centralized congestion control, improving a security assistance effect of a vehicle.

BRIEF DESCRIPTION OF DRAWINGS

FIG. 4A is a schematic diagram of an example of adjusting a packet transmission period from 100 ms to 200 ms in a congestion control method according to the present application;

FIG. 4B is a schematic diagram of an example of adjusting a packet transmission period from 100 ms to 300 ms in a congestion control method according to the present application;

DESCRIPTION OF EMBODIMENTS

Figure 1:
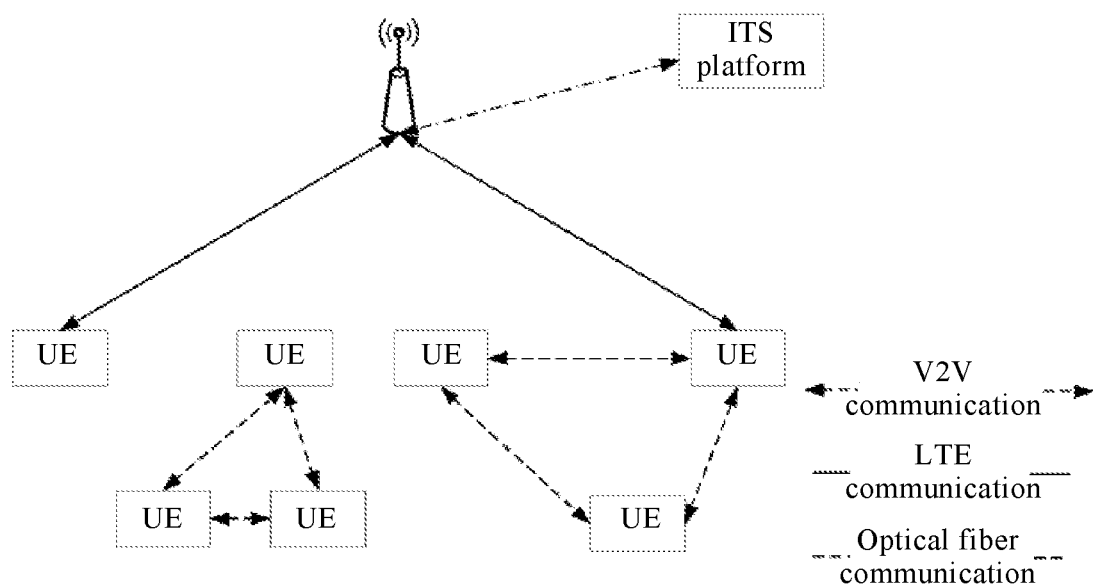
FIG. 1 is a schematic diagram of an architecture applicable to a congestion control method according to the present application.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, an E-UTRA system, a 5G mobile communications system, and other communications systems.

User equipment (UE) in this application, for example, may be a mobile terminal such as a mobile phone (or referred to as a "cellular" phone) or a computer having a mobile terminal, or may be portable, pocket-sized, handheld, or computer built-in a vehicle user equipment (VUE), and exchanges voice and/or data with a radio access network. For example, the user equipment may be a device such as a personal communication service (PCS) phone, a cordless telephone set, a Session Initiation Protocol (SIP) phone, a wireless local loop (WLL) station, a personal digital assistant (PDA), or the like. A wireless terminal may also be referred to as a system, a subscriber unit, a subscriber station, a mobile station, a remote station, a remote terminal, an access terminal, a user terminal, a user agent, a user device, or user equipment.

A base station in this application may be a device that communicates with the wireless terminal over an air interface in an access network by using one or more sectors. The base station may be configured to mutually convert a received over-the-air frame and an IP packet, and serve as a router between the wireless terminal and a rest portion of the access network, where the rest portion of the access network may include an Internet protocol (IP) network. The base station may further coordinate attribute management of the air interface. For example, the base station may be a base transceiver station (BTS) in GSM or CDMA, may be a NodeB (NodeB) in WCDMA, or may be an evolved NodeB (NodeB, eNB, or e-NodeB, evolved Node B) in LTE, or a 5G base station, and is not limited in this application.

In the embodiments of the present invention, based on a scenario, congestion control is classified into congestion control in an in-coverage (IC) scenario and congestion control in an out-of-coverage (OOC) scenario. In the IC scenario, congestion control is performed in a manner in which centralized congestion control (CCC) is primary and decentralized congestion control (DCC) is auxiliary. In the OOC scenario, congestion control is performed in a DCC manner. The following describes an architecture applicable to the present application by using an example in which a base station is specifically an LTE base station. For details, refer to FIG. 1.

FIG. 1 is a schematic diagram of an architecture applicable to a congestion control method according to the present application. As shown in FIG. 1, V2V communication is performed between UEs, as shown by using a dashed line arrow in this figure; Long Term Evolution (LTE) communication is performed between UE and a base station, as shown by using a solid line arrow in this figure; and a connection is established between the base station and an intelligent transport system (ITS) platform by using an optical fiber, as shown by using a dash-dot line arrow in this figure. In an IC scenario, an air interface, to be specific, a Uu interface, is established between a base station and UE for wireless communication, and a PC5 interface is established between UEs. In an OOC scenario, there is no base station, and a PC5 interface is established between UEs. Based on FIG. 1, the following describes in detail congestion control in an IC scenario in the present application.

Figure 2:
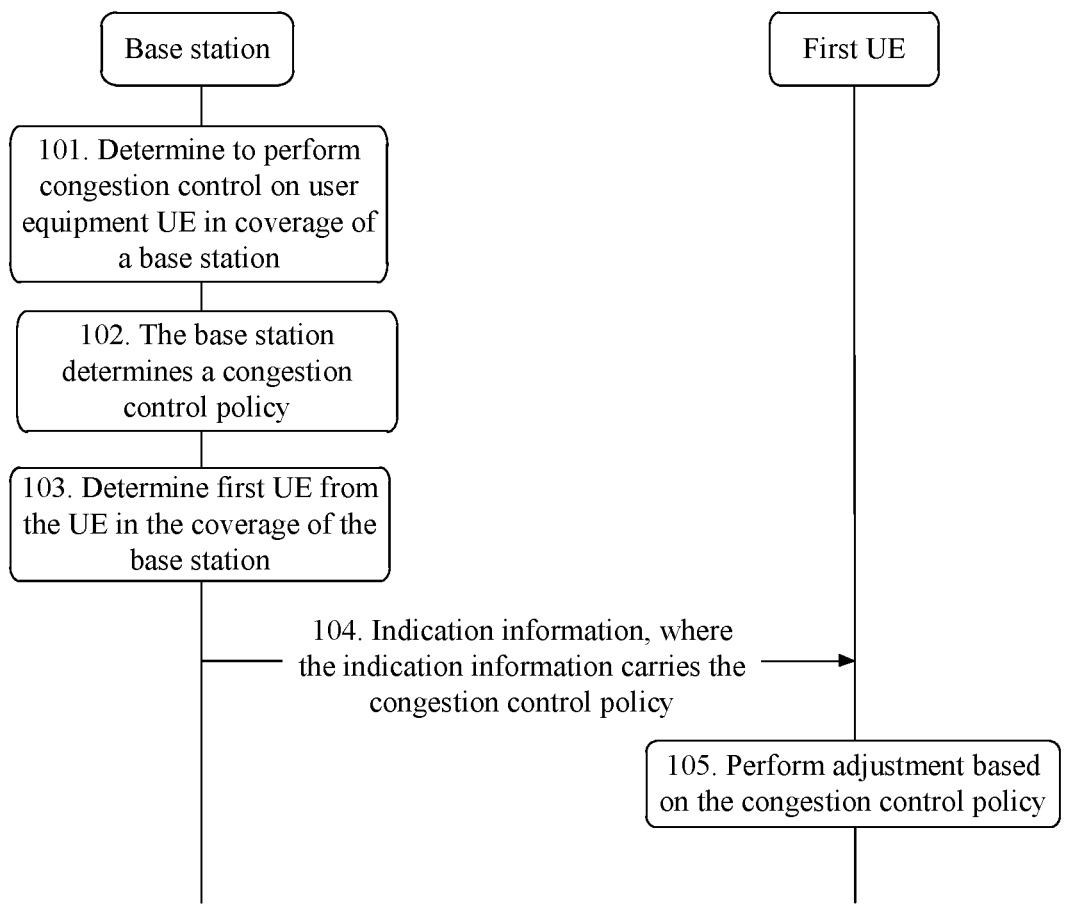
FIG. 2 is a signaling diagram of a congestion control method according to an embodiment of the present invention.

Specifically, referring to FIG. 2, FIG. 2 is a signaling diagram of a congestion control method according to an embodiment of the present invention. This embodiment includes the following steps.

101. A base station determines to perform congestion control on user equipment UE in coverage of the base station.

In this embodiment of the present invention, the base station may perform congestion control by using the base station as a unit, to perform congestion control on the UE in the coverage of the entire base station, or may perform congestion control by using a cell of the base station as a unit. In this case, the base station has at least one cell, and the base station performs congestion control on the UE by using the cell as a unit. If no special description is given below, the performing, by a base station, congestion control on UE in coverage of the base station is performing, by the base station, congestion control on UE in a specific cell of the base station. In this step, the base station determines, based on a quantity of service packet transmission times of the UE in the coverage of the base station, resource utilization of a resource pool, and the like, whether to start congestion control; if congestion control is started, step 102 is performed; and if congestion control is not started, congestion control is not performed.

In a feasible implementation, a manner of determining, by the base station, whether to start congestion control is as follows: For a cell of the base station, the base station determines whether a quantity of transmission times of UE in the cell meets a preset quantity of transmission times; if the base station determines that the quantity of transmission times meets the preset quantity of transmission times, the base station determines whether the UE in the cell meets a congestion control condition; and if the congestion control condition is met, the base station determines to perform congestion control on the UE in the cell. The congestion control condition includes a first condition and/or a second condition. Under the first condition, a sum of resource requirements of the UE in the cell is greater than resources that can be used for direct communication between UEs in the UE in the cell. The resources that can be used include a reused resource. To be specific, in V2X communication, if a distance between UEs is relatively long, and a same time-frequency resource is reused between the UEs, the time-frequency resource is a reused resource. Under the second condition, a transmission delay of at least one of the UE in the cell is greater than a congestion control delay threshold.

Specifically, the base station first performs transmission times adaptation, and then determines a congestion control status.

In a transmission times adaptation process, the quantity of service packet transmission times of the UE is determined based on network load, to be specific, based on both resource block (RB) utilization of a scheduling allocation (SA) resource pool and UE distribution, to increase a quantity of scheduled UE in the cell, reduce inter-UE interference, and improve a PDR of a network. For example, the quantity of transmission times is 2 or 4. When resource utilization of the network and/or a UE distribution density is less than a preset threshold, four times of transmission are performed. When the resource utilization of the network and/or the UE distribution density is greater than the preset threshold, two times of transmission are performed. The transmission times adaptation may be classified into cell-level adaptation and cluster-level adaptation. In terms of time, the transmission times adaptation may be performed in real time or based on a time segment.

When the quantity of transmission times is relatively small, for example, 2, the congestion control status is determined. In other words, whether the first condition and/or the second condition is met is determined. When the first condition is met, the sum Σ of the resource requirements of the UE is greater than resources that can be used for vehicle direct communication (VDC). When the second condition is met, a transmission delay of the UE is greater than the congestion control delay threshold. When the first condition or the second condition is met, a waiting delay of the UE definitely times out, and therefore a service packet cannot be scheduled.

102. The base station determines a congestion control policy.

In this step, the base station determines the specific congestion control policy. The congestion control policy may include the following various policies:

A first policy is used to instruct first UE to serve as UE whose transmission delay is greater than the congestion control delay threshold, to be specific, to instruct the first UE to discard a service packet, which is short for packet discarding.

A second policy is used to instruct first UE to adjust a packet transmission period, for example, increase or decrease a current packet transmission period, or keep a current packet transmission period unchanged. The first UE is determined from the UE in the cell. When the base station needs to adjust a packet transmission period of each UE in a scheduling queue, the base station determines a same packet transmission period, and sends the packet transmission period to each UE in the cell by using a SIB, so that each UE in the cell adjusts a current packet transmission period to the same packet transmission period, and each UE in the cell uses the same packet transmission period.

A third policy is used to instruct first UE to adjust transmit power.

A fourth policy is used to instruct first UE to perform adaptive modulation and coding (AMC), to dynamically adjust a quantity of RBs.

A fifth policy is used to instruct first UE to perform multicarrier load balancing or multicarrier coordination.

A sixth policy is used to instruct first UE to transmit a service packet by using a Uu interface.

103. The base station determines first UE from the UE in the coverage of the base station.

In this step, the base station determines, from the UE in the coverage of the base station, UE for which congestion needs to be alleviated according to the congestion control policy, namely, the first UE. In a determining process, the base station may determine, based on priorities of different UE, for example, a service type priority and a priority of a logical channel group, which UE may serve as the first UE to perform packet transmission period adjustment, and determine, based on a congestion control status identifier reported by the UE, which UE may serve as the first UE to perform packet transmission period adjustment. The base station determines which UE needs to change a packet transmission period; and the base station determines which UE needs to send a service packet by using a Uu interface.

104. The base station sends indication information to the first UE, where the indication information carries the congestion control policy.

In this step, the base station sends the congestion control policy to the first UE by using radio resource control (RRC) signaling, a system information block (SIB), or downlink control information (DCI).

105. The first UE performs adjustment according to the congestion control policy.

In this step, a PC5 interface is established between UEs. In this step, the first UE performs adjustment according to the congestion control policy, to alleviate a congestion status of a PC5 interface.

Specifically, with reference to step 102, if the congestion control policy is specifically the first policy, the first UE discards the service packet. In other words, the first UE serves as the UE whose transmission delay is greater than the congestion control delay threshold. If the congestion control policy is specifically the second policy, the first UE adjusts a packet transmission period of the service packet, for example, increases the packet transmission period, decreases the packet transmission period, or keeps the packet transmission period unchanged. If the congestion control policy is specifically the third policy, the transmit power of the first UE is adjusted. If the congestion control policy is specifically the fourth policy, AMC adaptation is performed; if the congestion control policy is specifically the fifth policy, the service packet is sent by using the Uu interface.

According to the congestion control method provided in this embodiment of the present invention, after determining that congestion control needs to be performed, the base station determines the congestion control policy, determines, from the UE in the coverage of the base station, the first UE that needs to perform adjustment according to the congestion control policy, and then sends the congestion control policy to the first UE, so that the first UE performs adjustment, to alleviate the congestion status of the PC5 interface. In this process, the base station performs centralized control on all UE in the coverage of the base station. This resolves a problem of a poor security assistance effect caused by a decentralized congestion control policy in 802.11P. In other words, the base station performs centralized congestion control, improving a security assistance effect of a vehicle.

The foregoing embodiment may be understood as a centralized congestion control process of the base station. Then, after the first UE sends a scheduling request, if the first UE does not receive scheduling from the base station after a timer expires, and when the first UE finds congestion, the first UE automatically performs some behavior to alleviate the congestion. Automatic behavior of UE is a UE-assisted congestion control process. The following describes in detail the UE-assisted congestion control process in the present application.

Specifically, after the scheduling request (SR) sent by the first UE is not responded all the time, a listening mechanism is started. After it is found that the PC5 interface is congested, UE behavior is automatically selected to alleviate the congestion status. The automatic behavior includes the following:

First behavior is that the first UE adjusts a period.

Specifically, the first UE adjusts the packet transmission period or the like of the UE by adjusting a packet transmission period at an application layer or a sending period of the SR or by setting a timer.

Second behavior is that the first UE allocates a resource in a contention manner when determining, by using a timer of the first UE, that a packet transmission interval is greater than a preset threshold, or that the first UE discards a packet when determining that the packet transmission interval is not greater than the preset threshold.

Third behavior is that the first UE determines whether load of a PC5 interface resource pool or resource block (RB) utilization of the resource pool is greater than a preset threshold, and reports congestion status information of the PC5 interface to the base station if the load or the utilization is greater than the preset threshold.

Fourth behavior is that the first UE serves as the UE whose transmission delay is greater than the congestion control delay threshold, and that the UE discards the data packet.

In this embodiment, based on the foregoing primary centralized congestion control performed by the base station, the UE performs decentralized congestion control, to further improve the security assistance effect.

Figure 3:
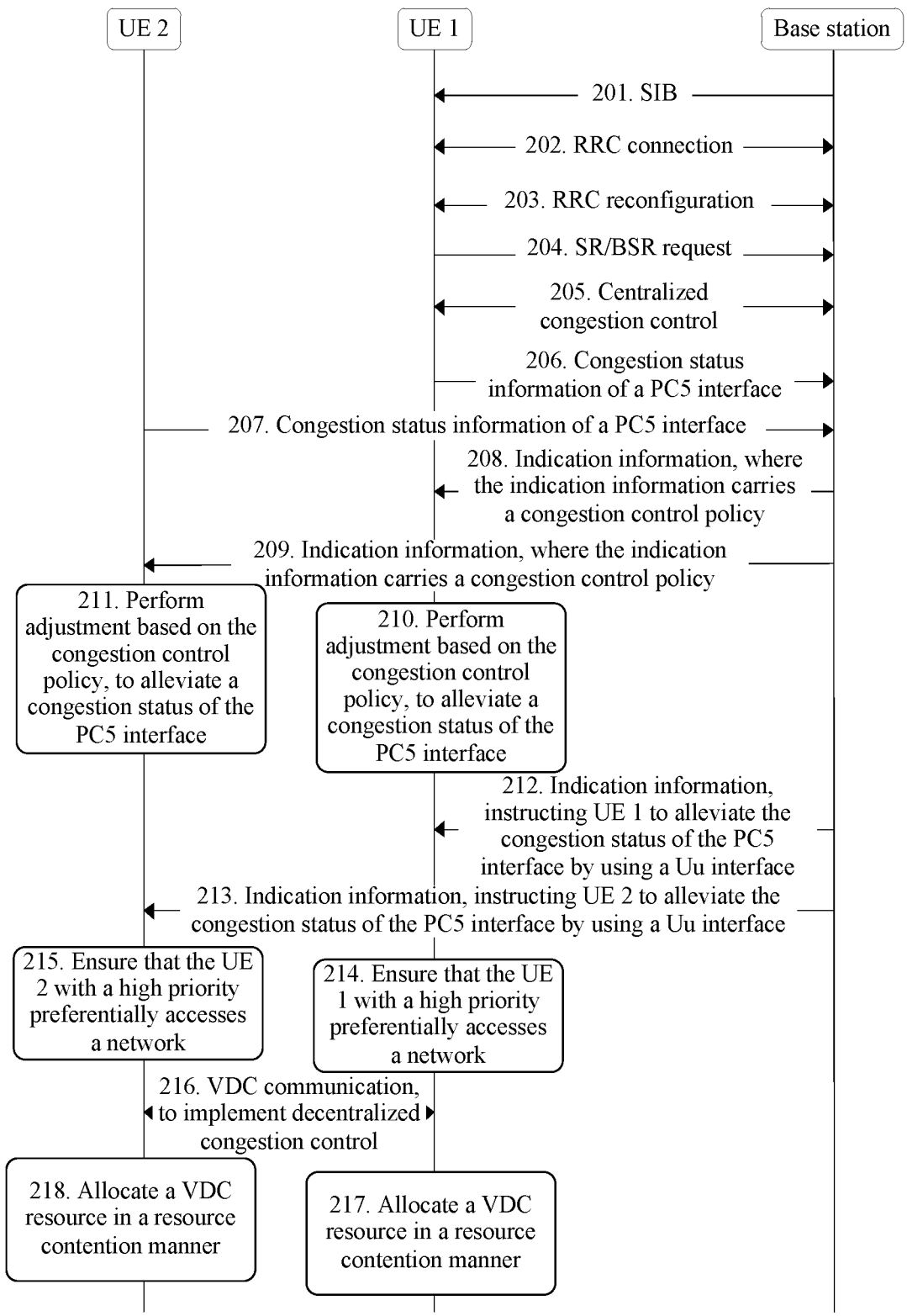
FIG. 3 is a signaling diagram of centralized control performed by a base station and decentralized congestion control performed by UE in a congestion control method according to the present application.

FIG. 3 is a signaling diagram of centralized control performed by a base station and decentralized congestion control performed by UE in a congestion control method according to the present application. The following steps are included.

201. A base station sends a SIB to UE 1.

In this step, the base station sends the system information block to the UE 1, broadcasts a resource configuration of a current cell, and reuses ProSeComnPoolist in a current SIB18.

202. The base station establishes an RRC connection to the UE 1.

203. The base station completes RRC reconfiguration with the UE 1.

204. The base station receives an SR/BSR request sent by the UE 1.

It should be noted that, in steps 201 to 204, although only signaling interaction between the UE 1 and the base station is described, actually, signaling interaction is also performed between other UE, such as UE 2, in coverage of the base station and the base station.

205. The base station performs centralized congestion control.

206. The base station receives congestion status information, reported by the UE 1, of a PC5 interface.

207. The base station receives congestion status information, reported by UE 2, of a PC5 interface.

In steps 206 and 207, the base station receives the congestion status information, reported by the UE by using a media access control (Media Access Control, MAC) control element (Control Element, CE), RRC signaling, a physical uplink control channel (PUCCH), or the like, of the PC5 interface.

208. The base station sends indication information to the UE 1, where the indication information carries a congestion control policy.

209. The base station sends indication information to the UE 2, where the indication information carries a congestion control policy.

In steps 208 and 209, after determining the congestion control policy, the base station sends the congestion control policy to the UE by using RRC signaling, DCI, a SIB, or the like. The control policy is, for example, the first policy to the fifth policy in step 102 in the foregoing embodiment in FIG. 2.

210. The UE 1 performs adjustment according to the congestion control policy, to alleviate a congestion status of the PC5 interface.

211. The UE 2 performs adjustment according to the congestion control policy, to alleviate a congestion status of the PC5 interface.

In steps 210 and 211, the UE performs adjustment according to the congestion control policy. In this way, the base station implements centralized congestion control.

212. The base station sends indication information to the UE 1, to instruct the UE 1 to alleviate the congestion status of the PC5 interface by using a Uu interface.

213. The base station sends indication information to the UE 2, to instruct the UE 2 to alleviate the congestion status of the PC5 interface by using a Uu interface.

214. The base station ensures that the UE 1 with a high priority preferentially accesses a network.

215. The base station ensures that the UE 2 with a high priority preferentially accesses a network.

In steps 214 and 215, when new UE, for example, the UE 1 and the UE 2, accesses the network, the base station preferentially ensures access by UE with a high priority, and rejects access by UE with a low priority.

216. The UE 1 and the UE 2 perform VDC communication, to implement decentralized congestion control.

217. The UE 1 allocates a VDC resource in a resource contention manner.

218. The UE 2 allocates a VDC resource in a resource contention manner.

In steps 217 and 218, it is assumed that the UE 1 and the UE 2 do not receive scheduling from the base station after a timer expires, or when a waiting time of sending an SR/BSR request expires, VDC communication is performed, to implement decentralized congestion control.

The following describes in detail the present application by using an example in which UE is specifically VUE.

First, a congestion control policy process is described.

Specifically, a congestion control policy includes a congestion control start phase and a congestion control adjustment phase. When a congestion control condition is met, the congestion control start phase is started. Because a vehicle moves in real time, UE is handed over between cells or new UE enters a cell. A congestion control process is a step-by-step adjustment process. After congestion control is started, different congestion control policies are set based on a base station, and the congestion control adjustment phase is entered.

Then, concepts used in this embodiment, a measurement period, a resource pool scheduling allocation period, and a packet transmission period, are explained.

The measurement period includes Q resource pool scheduling allocation periods, where Q≥1, and Q is an integer. A $Qi^{th}$ resource pool scheduling allocation period is any one of the Q resource pool scheduling allocation periods, Q≥1, 1≤Qi≤Q, and both Q and Qi are integers.

The resource pool scheduling allocation period: In this embodiment of the present invention, scheduling allocation (SA) may be understood as a set of time-frequency resources and has a constant period, and the period is the resource pool scheduling allocation period and denoted by an SA period.

The packet transmission period indicates a period of sending service packets by first VUE at an application layer in a measurement period.

Next, the second policy in step 102 in the foregoing embodiment is mainly described in detail. The second policy is used to instruct first VUE to adjust a packet transmission period.

Specifically, the adjusting a packet transmission period mainly includes the following several possible implementations:

In a possible implementation, some VUE in coverage of a base station is scheduled in a measurement period, and the VUE forms a scheduling queue. In the measurement period, a first packet transmission period (a length is indicated by T) is determined based on a quantity (a value is indicated by M) of VUE that is authorized for scheduling in the scheduling queue and a quantity (a value is indicated by N) of VUE that is unauthorized for scheduling in the scheduling queue, where the first packet transmission period is greater than a current packet transmission period; and a quantity (a value is indicated by S) of the first VUE is determined for a $Qi^{th}$ resource pool scheduling allocation period based on a quantity (a value is indicated by Mi) of VUE that is authorized for scheduling in the scheduling queue, a quantity (a value is indicated by Ni) of VUE that is unauthorized for scheduling in the scheduling queue, and a quantity (a value is indicated by Di) of VUE whose transmission delay is greater than a congestion control delay threshold.

$$T = \begin{cases} \dfrac{M+N}{M} \times 100 \text{ ms} & N \geq M \\ 2 \times 100 \text{ ms} & M < N \end{cases}; \text{ and}$$

$$S = \begin{cases} Mi + Ni & Ni \geq (T-1) \times Mi \\ Di + Di(T-1) & Ni < (T-1) \times Mi \end{cases}.$$

A size of a transmitted packet in a V2V service model is variable. Therefore, a filter parameter (indicated by ∂) may be used to further determine S, where S=(1−∂)×S in a previous measurement period+∂×S in a current measurement period.

After the quantity of the first VUE is determined, the base station may automatically determine which VUE in the scheduling queue may serve as the first VUE. For example, the base station may set a timer for each VUE, and VUE whose timer has a longest waiting time serves as the first VUE.

For example, as shown in FIG. 4A and FIG. 4B, FIG. 4A is a schematic diagram of an example of adjusting a packet transmission period from 100 ms to 200 ms in a congestion control method according to the present application, and FIG. 4B is a schematic diagram of another example of adjusting a packet transmission period from 100 ms to 300 ms in a congestion control method according to the present application. In FIG. 4A, a first packet transmission period is equal to 200 ms, to be specific, the first packet transmission period is equal to a quantity of first VUE multiplied by 100 ms, and the quantity of first VUE is 2. In FIG. 4B, a first packet transmission period is equal to 300 ms, to be specific, the first packet transmission period is equal to a quantity of first VUE multiplied by the packet transmission period (e.g. 100 ms), and the quantity of first VUE is 3. The packet transmission period is a packet transmission period before adjustment.

The foregoing process is a process of increasing a packet transmission period. Then, because a vehicle moves in real time, a scheduling queue no longer meets a first condition and a second condition. In this case, the base station determines a second packet transmission period, where the second packet transmission period is less than a current packet transmission period of second VUE; the base station determines the second VUE from the scheduling queue, where the second VUE is VUE with a high priority in the scheduling queue; and the base station sends indication information to the second VUE, to instruct the second VUE to adjust the current packet transmission period to the second packet transmission period.

Specifically, in the measurement period, when RB utilization of a resource pool in the $Qi^{th}$ resource pool scheduling allocation period is less than an RB utilization threshold of congestion control, where the RB utilization threshold is 0.7 by default and may be flexibly configured, a particular quantity of VUE is selected from a $Qi^{th}$ scheduling queue as the second VUE, and packet transmission periods of the VUE are decreased to the second packet transmission period.

In this case, a quantity of second VUE=a total quantity of RBs in a resource pool×(1−the RB utilization threshold of congestion control)/an average quantity of RBs scheduled for each user in the measurement period; and the average quantity of RBs scheduled for each user in the measurement period=an average value of quantities of RBs of all VUE applying for a VDC resource in the measurement period.

For the $Qi^{th}$ scheduling queue, the second VUE selected from a scheduled user is VUE with a maximum packet transmission period, the packet transmission period is changed to the second packet transmission period, and the second packet transmission period is configured as 100 ms by default, and may be flexibly configured.

In a selection process, all VUE users with a high priority are first selected from the $Qi^{th}$ scheduling queue and packet transmission periods of all the VUE preferentially adjusted to 100 ms, in other words, the second packet transmission period is equal to 100 ms; and then a user with a low priority is adjusted.

If the quantity of VUE in the $Qi^{th}$ scheduling queue is not enough, and an expected quantity of second VUE cannot be selected, the $Qi^{th}$ resource pool scheduling allocation period is used as a start point, users with a high priority in the scheduling queue in first N resource pool scheduling allocation periods of the current resource pool scheduling allocation period are traversed, and packet transmission periods of the users with a high priority in the scheduling queue in the first N resource pool scheduling allocation periods are adjusted to the second packet transmission period, until RB utilization of a $Qi^{th}$ resource pool is greater than the RB utilization threshold of congestion control, or until packet transmission periods of all users in the first N resource pool scheduling allocation periods are adjusted to the second packet transmission period.

In addition, in the $Qi^{th}$ resource pool scheduling allocation period, if the RB utilization of the resource pool is balanced against a congestion control threshold, no VUE needs to adjust a packet transmission period.

In another possible implementation, the congestion control policy is specifically used to instruct a base station to determine a first packet transmission period and a quantity of first VUE for a $Qi^{th}$ resource pool scheduling allocation period. The first packet transmission period is an integral multiple of a packet transmission period of UE whose packet transmission period is minimum in the $Qi^{th}$ resource pool scheduling allocation period.

Specifically, the base station determines, based on each resource pool scheduling allocation period in a measurement period, a quantity of VUE whose transmission delay is greater than a delay threshold. The delay threshold is 60 ms by default, and may be flexibly configured. A quantity of VUE whose transmission delay is greater than the congestion control delay threshold in a $Qi^{th}$ resource pool scheduling allocation period may be used as a reference value of a quantity of VUE whose transmission delay is greater than the congestion control delay threshold in a $Qi^{th}$ resource pool scheduling allocation period corresponding to a next measurement period. When scheduling is to be performed in the next measurement period, a service packet period of VUE in a to-be-scheduled VUE queue is adjusted in advance. This reduces a service packet transmission delay of the VUE. The VUE whose transmission delay is greater than the congestion control delay threshold may also be referred to as VUE that discards a packet.

That a measurement period includes 10 resource pool scheduling allocation periods is used as an example. Quantities of VUE whose transmission delay is greater than the congestion control delay threshold in a zeroth resource pool scheduling allocation period to a ninth resource pool scheduling allocation period of the current measurement period are respectively used as reference values of quantities of VUE whose transmission delay is greater than the congestion control delay threshold in a zeroth resource pool scheduling allocation period to a ninth resource pool scheduling allocation period of a next measurement period. This reduces a waiting delay of a to-be-scheduling queue, and avoids that the waiting delay of the to-be-scheduled VUE queue is greater than the delay threshold. In this process, a to-be-scheduled user priority queue needs to be considered, to ensure a balance between a VUE user that has a high priority and that does not discard a packet and a VUE user that has a low priority and that discards a packet. The following describes in detail a case in which a priority is considered and a case in which no priority is considered.

The case in which no priority is considered is as follows:

Specifically, during traversing of the measurement period, if VUE whose transmission delay is greater than the congestion control delay threshold exists in the $Qi^{th}$ resource pool scheduling allocation period, and if a quantity of UE that is authorized for scheduling ≥2× the quantity of VUE whose transmission delay is greater than the congestion control delay threshold is met, VUE whose quantity is 2× the quantity of VUE whose transmission delay is greater than the congestion control delay threshold is selected from the quantity of UE that is authorized for scheduling. Packet transmission periods of the VUE are minimum, the packet transmission periods of the VUE are adjusted to an integral multiple of the minimum packet transmission period, and an adjusted packet transmission period is the first packet transmission period.

If a quantity of VUE that is authorized for scheduling <2× the quantity of VUE whose transmission delay is greater than the congestion control delay threshold is met, the first packet transmission period is equal to a value obtained by rounding up (the quantity of VUE whose transmission delay is greater than the congestion control delay threshold/the quantity of UE that is authorized for scheduling).

A maximum packet transmission period is limited. Therefore, a comparison relationship between the first packet transmission period determined according to the foregoing formula and the maximum packet transmission period needs to be further determined, and a minimum value is selected from the two values as the first packet transmission period.

Figure 5A:
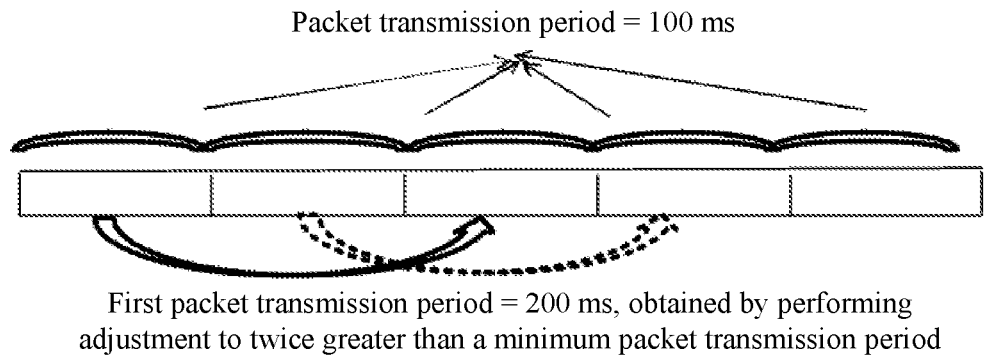
FIG. 5A is a schematic diagram of another example of adjusting a packet transmission period from 100 ms to 200 ms in a congestion control method according to the present application.
Figure 5B:
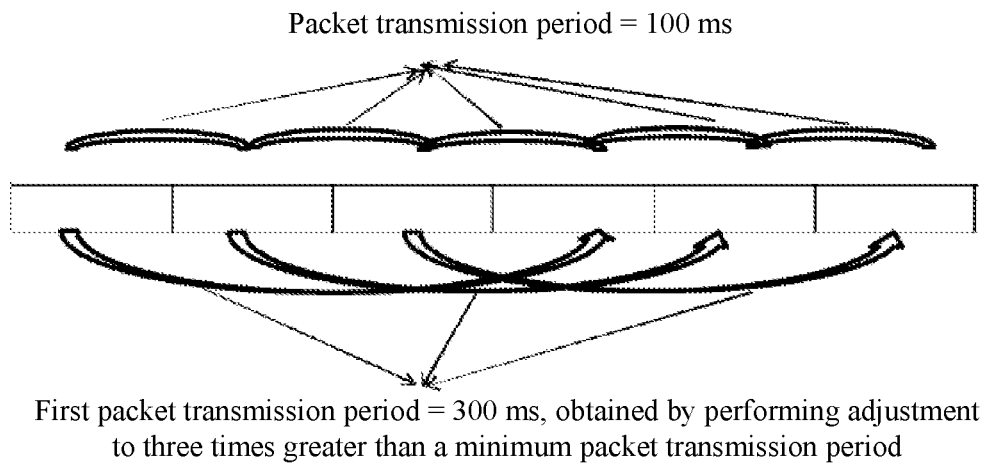
FIG. 5B is a schematic diagram of another example of adjusting a packet transmission period from 100 ms to 300 ms in a congestion control method according to the present application.

For example, as shown in FIGS. 5A and 5B, FIG. 5A is a schematic diagram of another example of adjusting a packet transmission period from 100 ms to 200 ms in a congestion control method according to the present application, and FIG. 5B is a schematic diagram of another example of adjusting a packet transmission period from 100 ms to 300 ms in a congestion control method according to the present application. In FIG. 5A, a first packet transmission period is equal to 200 ms, to be specific, is adjusted to twice greater than a minimum packet transmission period. In FIG. 5B, a first packet transmission period is 300 ms, to be specific, is adjusted to three times greater than a minimum packet transmission period.

The foregoing process is a process of increasing a packet transmission period. Then, because a vehicle moves in real time, a scheduling queue no longer meets a first condition and a second condition. In this case, the base station determines a second packet transmission period, where the second packet transmission period is less than a current packet transmission period of second VUE; the base station determines the second VUE from the scheduling queue, where the second VUE is VUE with a high priority in the scheduling queue; and the base station sends indication information to the second VUE, to instruct the second VUE to adjust the current packet transmission period to the second packet transmission period.

Specifically, when RB utilization of a resource pool in the $Qi^{th}$ resource pool scheduling allocation period is less than an RB utilization threshold of congestion control, a particular quantity of VUE is selected from the scheduling queue in the current resource pool scheduling allocation period. The RB utilization threshold is 0.7 by default and may be flexibly configured, and the particular quantity is 1 by default and may be flexibly configured. VUE with a maximum packet transmission period is selected, and the packet transmission period is adjusted to the second packet transmission period. The second packet transmission period is configured as 100 ms by default and may be flexibly configured.

If lengths of packet transmission periods of all VUE in the scheduling queue are adjusted to 100 ms, the $Qi^{th}$ resource pool scheduling allocation period is used as a start point, users with a high priority in the scheduling queue in first N resource pool scheduling allocation periods of the current resource pool scheduling allocation period are traversed, and packet transmission periods of the users with a high priority in the scheduling queue in the first N resource pool scheduling allocation periods are adjusted to 100 ms, until RB utilization of a $Qi^{th}$ resource pool is greater than the RB utilization threshold of congestion control, or until packet transmission periods of all users in the first N resource pool scheduling allocation periods are adjusted to 100 ms. In this process, that the second packet transmission period is 100 ms is used as an example. Actually, the second packet transmission period may also be configured as another value.

In addition, in the $Qi^{th}$ resource pool scheduling allocation period, if the RB utilization of the resource pool is balanced against a congestion control threshold, no VUE needs to adjust a packet transmission period.

The case in which a priority is considered is as follows:

Specifically, during traversing of the 10 resource pool scheduling allocation periods of the measurement period (for example, 100 ms), if a quantity of VUE whose transmission delay is greater than the congestion control delay threshold in a $Qi^{th}$ (a value range is 0 to 10) resource pool scheduling allocation period is greater than 0, the quantity of VUE whose transmission delay is greater than the congestion control delay threshold is compared with a quantity M of VUE that is authorized for scheduling in the $Qi^{th}$ resource pool scheduling allocation period. In the $Qi^{th}$ resource pool scheduling allocation period, the VUE that is authorized for scheduling includes high-priority VUE that is authorized for scheduling and low-priority VUE that is authorized for scheduling.

When a packet transmission period needs to be increased to the first packet transmission period, a packet transmission period of the low-priority VUE that is authorized for scheduling is preferentially increased to the first packet transmission period. After packet transmission periods of all low-priority VUE that is authorized for scheduling are increased to the first packet transmission period, if congestion is still not alleviated, a packet transmission period of the high-priority VUE that is authorized for scheduling is increased to the first packet transmission period.

When a packet transmission period needs to be decreased to a second packet transmission period, a packet transmission period of the high-priority VUE that is authorized for scheduling is preferentially decreased to the second packet transmission period. After packet transmission periods of all high-priority VUE that is authorized for scheduling are decreased to the second packet transmission period, if RB utilization of a resource pool does not reach a congestion control threshold, a packet transmission period of the low-priority VUE that is authorized for scheduling is decreased to the second packet transmission period.

In addition, in the $Qi^{th}$ resource pool scheduling allocation period, if the RB utilization of the resource pool is balanced against the congestion control threshold, no VUE needs to adjust a packet transmission period.

Next, the first policy in step 102 in the foregoing embodiment is described in detail. The first policy is used to instruct first VUE to serve as VUE whose transmission delay is greater than a congestion control delay threshold, to be specific, to instruct the first VUE to discard a service packet, which is short for packet discarding.

In this embodiment, the discarding, by the first VUE, a service packet mainly includes the following several possible implementations.

In a possible implementation, a base station determines a first quantity for a $Qi^{th}$ resource pool scheduling allocation period of a current measurement period, where the first quantity is a quantity of first VUE whose transmission delay is greater than the congestion control delay threshold in the $Qi^{th}$ resource pool scheduling allocation period of the current measurement period; and the base station determines a second quantity based on the first quantity for a $Qi^{th}$ resource pool scheduling allocation period of a next measurement period, where the second quantity is a final quantity of first VUE whose transmission delay is greater than the congestion control delay threshold in the $Qi^{th}$ resource pool scheduling allocation period of the next measurement period. The base station determines an original quantity for the $Qi^{th}$ resource pool scheduling allocation period of the next measurement period. The original quantity is an original quantity of first VUE whose transmission delay is greater than the congestion control delay threshold in the $Qi^{th}$ resource pool scheduling allocation period of the next measurement period, and the second quantity is equal to a sum of the first quantity and the original quantity.

Specifically, a quantity of VUE whose waiting delay is greater than the congestion control delay threshold in the $Qi^{th}$ resource pool scheduling allocation period of the next measurement period is determined based on whether there is VUE whose transmission delay is greater than the congestion control delay threshold in the $Qi^{th}$ resource pool scheduling allocation period of the current measurement period. When RB utilization of a resource pool is less than a particular threshold, no packet is discarded or fewer packets are discarded, to increase scheduled users and improve the RB utilization of the resource pool. When VUE is handed over or there is a new accessing user, the base station ensures that a quantity of discarded packets of the new user is a maximum value or an intermediate value of quantities of discarded packets of all users in a cell, to prevent the new user from continuously discarding packets.

Figure 6:
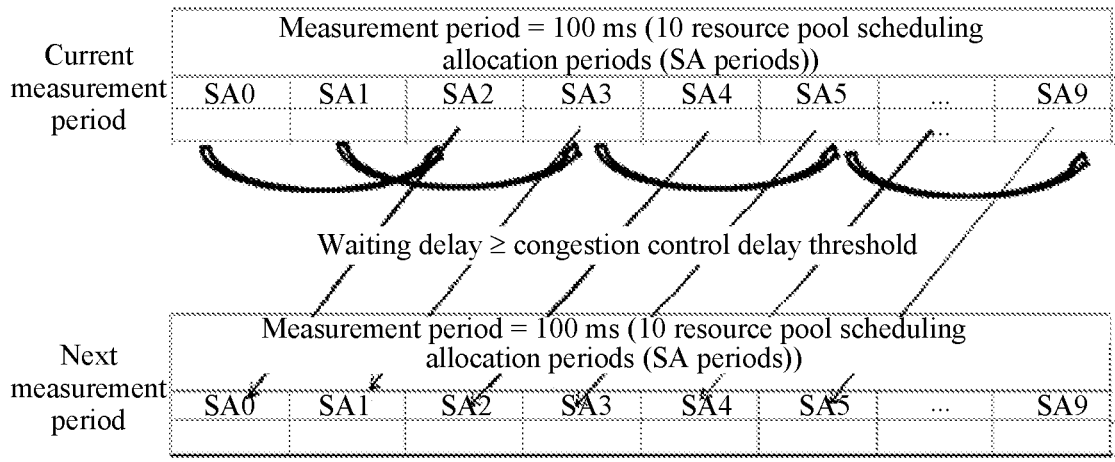
FIG. 6 is a schematic flowchart of a packet discarding scheme in a congestion control method according to the present application.

Specifically, a quantity of VUE whose transmission delay is greater than the congestion control delay threshold in each resource pool scheduling allocation period of the measurement period needs to be mapped onto a location of a next to-be-scheduled resource pool scheduling allocation period, and is used as a reference value of a quantity of VUE whose transmission delay is greater than the congestion control delay threshold in a resource pool scheduling allocation period corresponding to the next measurement period. In addition, a to-be-scheduled user priority queue needs to be considered, to ensure a balance between a VUE user that has a high priority and that does not discard a packet and a VUE user that has a low priority and that discards a packet. Specifically, referring to FIG. 6, FIG. 6 is a schematic flowchart of a packet discarding scheme in a congestion control method according to the present application. In FIG. 6, a measurement period includes 10 resource pool scheduling allocation periods: SA0 to SA9.

In a congestion control adjustment phase, RB utilization of a resource pool in a resource pool scheduling allocation period is greater than a resource utilization threshold of congestion control, and a quantity of VUE whose transmission delay is greater than a congestion control delay threshold in a scheduling allocation period of each measurement period is greater than or equal to 0. In this case, a newly added quantity of discarded packets in each scheduling allocation period is accumulated based on an original quantity.

Figure 7:
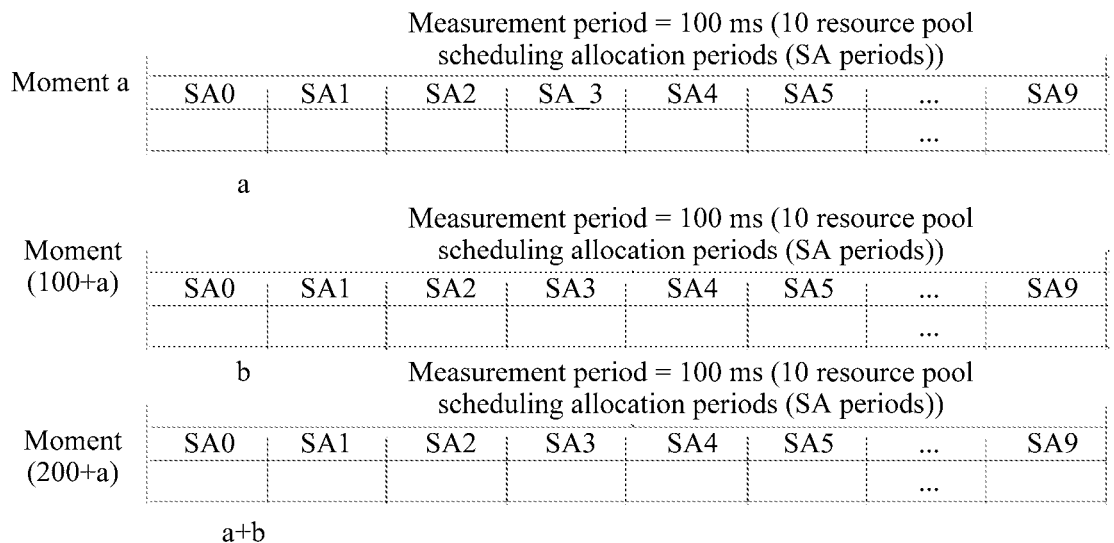
FIG. 7 is a schematic diagram of a process of accumulating a discarded packet in a congestion control method according to the present application.

A quantity of VUE whose transmission delay is greater than the congestion control delay threshold at a moment a is a, and a quantity of VUE whose transmission delay is greater than the congestion control delay threshold at a moment 100+a is b. Therefore, at a moment 200+a, a quantity of discarded packets is a+b. Specifically, referring to FIG. 7, FIG. 7 is a schematic diagram of a process of accumulating a discarded packet in a congestion control method according to the present application.

A size of a transmitted packet in a V2V service model is variable. Therefore, a filter manner is used to determine a fluctuation of a simulated adjustment value. Assuming that a filter parameter is indicated by $\partial$, a quantity of VUE whose transmission delay is greater than a congestion control delay threshold=$(1-\partial)\times$a quantity of VUE whose transmission delay is greater than the congestion control delay threshold in a resource pool scheduling allocation period corresponding to a previous measurement period+$\partial\times$a quantity of VUE whose transmission delay is greater than the congestion control delay threshold in a resource pool scheduling allocation period corresponding to a current measurement period, where ∂ is 0.5 by default.

The foregoing describes a process of accumulating and increasing a quantity of discarded packets. However, because a vehicle moves in real time, when neither a first condition nor a second condition for congestion control is met, a second quantity needs to be decreased.

Specifically, step 1: RB utilization of a resource pool in a $Qi^{th}$ resource pool scheduling allocation period is less than an RB utilization threshold of congestion control, where the RB utilization threshold is 0.7 by default and may be flexibly configured. In this case, a quantity of VUE that discards a packet in the current resource pool scheduling allocation period is decreased, until the quantity of VUE that discards a packet in the resource pool scheduling allocation period is 0. For example, when the quantity of VUE that discards a packet in the current resource pool scheduling allocation period is greater than 0, a particular value is subtracted from a quantity of VUE whose transmission delay is greater than a congestion control delay threshold in the current resource pool scheduling allocation period, until the quantity of VUE whose transmission delay is greater than the congestion control delay threshold in the current resource pool scheduling allocation period is zero. Step 2 is performed.

Step 2: If a sum of RBs of all to-be-scheduled users in the $Qi^{th}$ resource pool scheduling allocation period is greater than a product of a total quantity of RBs in a data resource pool in the $Qi^{th}$ resource pool scheduling allocation period and a reuse factor (when reusing is not started, a value of the reuse factor is 1; reusing is started, a value of the reuse factor is 1+X, and X is average RB utilization of reusing users in a measurement period), and when the quantity of VUE whose transmission delay is greater than the congestion control delay threshold in the current resource pool scheduling allocation period is greater than 0, where the quantity of VUE whose transmission delay is greater than the congestion control delay threshold is decreased with a decrement of H according to an alternate packet discarding rule, the quantity of VUE that discards a packet in the resource pool scheduling allocation period is updated, and an updated quantity of VUE whose transmission delay is greater than the congestion control delay threshold=the quantity of VUE whose transmission delay is greater than the congestion control delay threshold−H.

H=the total quantity of RBs in the resource pool×(1−the RB utilization threshold of congestion control)/an average quantity of RBs scheduled for each VUE in a to-be-scheduling queue.

The average quantity of RBs scheduled for each VUE in the to-be-scheduling queue=an average quantity of RBs of all VUE applying for a VDC resource in the measurement period.

When the condition is met, step 5 is performed; when the condition is not met, step 3 is performed.

Step 3: If the sum of RBs of all to-be-scheduled users in the $Qi^{th}$ resource pool scheduling allocation period is less than the total quantity of RBs in the data resource pool in the $Qi^{th}$ resource pool scheduling allocation period, a quantity of discarded packets in the $Qi^{th}$ resource pool scheduling allocation period is 0. In other words, the quantity of VUE that discards a packet in the $Qi^{th}$ resource pool scheduling allocation period is updated to 0.

If the sum of RBs of all to-be-scheduled users in the $Qi^{th}$ resource pool scheduling allocation period is less than the product of the total quantity of RBs in the data resource pool in the $Qi^{th}$ resource pool scheduling allocation period and the reuse factor (when reusing is not started, the value is 1; when reusing is started, the value is 1+X, and X is the average RB utilization of reusing users in the measurement period), the quantity of VUE whose transmission delay is greater than the congestion control delay threshold is 0, and processing is no longer performed on the to-be-scheduling queue in the resource pool scheduling allocation period.

Step 4 is performed.

Step 4: In this case, when the utilization of the resource pool is less than the RB utilization threshold of congestion control, the $Qi^{th}$ resource pool scheduling allocation period is used as a start point, users with a high priority in a scheduling queue in first N resource pool scheduling allocation periods of the current resource pool scheduling allocation period are traversed, and a quantity of VUE whose transmission delay is greater than the congestion control threshold in the first N resource pool scheduling allocation periods is decreased, until RB utilization in the resource pool scheduling allocation period is greater than the RB utilization threshold of congestion control, or until a quantity of VUE that discards a packet in the first N resource pool scheduling allocation periods is 0. If no VUE whose transmission delay is greater than the congestion control delay threshold exists in the scheduling queue in the first N resource pool scheduling allocation periods, descending processing is terminated in the current resource pool scheduling allocation period.

N=(the congestion control delay threshold/the resource pool scheduling allocation period). Step 5 is performed.

Step 5: The procedure is terminated.

In addition, in the foregoing packet discarding process, a base station determines a sequence that the second quantity of first VUE serves as first VUE whose transmission delay is greater than the congestion control delay threshold, so that the second quantity of first VUE successively serves as the first VUE whose transmission delay is greater than the congestion control delay threshold.

When the first VUE is handed-over VUE or new accessing VUE, a quantity of times that the handed-over VUE or the new accessing VUE serves as the first VUE is a maximum or an average quantity of times that the second quantity of VUE serves as the first VUE.

Specifically, in an SA resource pool scheduling allocation period of each measurement period, to-be-scheduled user queues are separately sorted based on delays, and packets of users that are in the to-be-scheduled user queues in the current SA resource pool scheduling allocation period and that newly apply for resource allocation by using SR/BSR are alternately discarded.

When VUE is handed over or there is a new accessing user, the base station ensures that a quantity of discarded packets of the new user is a maximum value or an intermediate value of quantities of discarded packets of all users in a cell.

In the $Qi^{th}$ resource pool scheduling allocation period, if a quantity of users with a low priority in the users newly applying for resource allocation by using the SR/BSR is greater than or equal to the quantity of VUE whose transmission delay is greater than the congestion control delay threshold, packets of the users with a low priority are alternately discarded, to ensure that a service packet of a user with a high priority is not discarded.

In the $Qi^{th}$ resource pool scheduling allocation period, if a quantity of users with a low priority in the users newly applying for resource allocation by using the SR/BSR is less than the quantity of VUE whose transmission delay is greater than the congestion control delay threshold, the users with a low priority send service packets based on a maximum packet transmission period in a V2X service model, and a user with a high priority discards a packet through polling.

Figure 8:
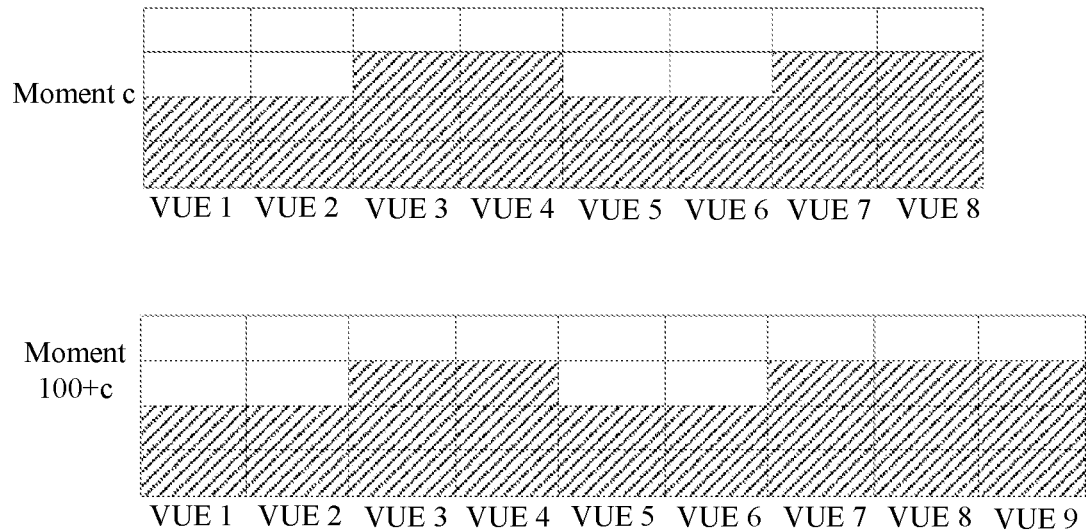
FIG. 8 is a schematic diagram of a process of alternately discarding a packet in a congestion control method according to the present application.

Specifically, referring to FIG. 8, FIG. 8 is a schematic diagram of a process of alternately discarding a packet in a congestion control method according to the present application. As shown in FIG. 8, at a moment c in a current measurement period (100 ms), a scheduling queue includes VUE 1 to VUE 8. Current quantities of packet discarding times of the VUE 1, VUE 2, VUE 5, and VUE 6 are 2, as shown by using hatched parts in the figure; and current quantities of packet discarding times of VUE 3, VUE 4, VUE 7, and the VUE 8 are 3. At a corresponding moment in a next measurement period, to be specific, at a moment 100+c, VUE 9 is newly added to the scheduling queue. An initial quantity of packet discarding times is assigned to the VUE 9, for example, 3, to avoid frequent packet discarding by the VUE 9 when a quantity of packet discarding times of the VUE 9 is increased from 0 to 3.

In another feasible implementation, a variable is first initialized. A variable is maintained for each accessing VUE_i in a cell, and an initial value of the variable is set to −1. Whether a variable is greater than 0 is determined in each 100 ms period. If the variable is greater than 0, 1 is accumulated, and a congestion control procedure is started. A to-be-scheduled VUE priority queue is traversed, and packet discarding processing is performed for VUE whose delay is greater than a threshold. A to-be-scheduling queue is traversed, and VUE whose variable is greater than 5 is preferentially scheduled, and is placed in the front of the queue, to form the to-be-scheduled VUE priority queue. When resource scheduling allocation is successfully performed for the VUE, the variable is updated to 0. When resource scheduling allocation fails to be performed for the VUE, no processing is performed.

Next, VUE behavior is mainly described in detail.

Specifically, after first VUE receives indication information sent by a base station, the first VUE sends a service packet in the following manners.

In a manner 1, the first VUE adjusts a packet transmission period at an application layer.

Specifically, the base station sends an adjusted packet transmission period to the first VUE, and the first VUE transfers the period to the application layer, so that the application layer sends the service packet based on the adjusted packet transmission period.

In a manner 2, the first VUE adjusts an SR sending period at a stratum.

Specifically, the base station transfers a period adjustment configuration parameter to the VUE, and the VUE sets an SR timer (sr-ProhibitTimer-r9, a value ranges from 0 to 7, and 0 indicates that there is no timer) based on the period configuration parameter, and sends the service packet based on a time length obtained by multiplying duration of the SR timer by the SR period. An SR timer parameter is in a MAC-main configuration information element (MAC-MainConfig Information element).

In a manner 3, the VUE sets a timer to control a packet transmission period.

When SR sent by the VUE is not responded all the time, a listening mechanism is started. After congestion is found, VUE behavior is automatically selected, to alleviate a congestion status. For details, refer to the foregoing descriptions about VUE-assisted congestion control. Details are not described herein again.

When network congestion occurs on an LTE system, and when there are a maximum quantity of online UE in a network, access and normal service processing performed by a new accessing user or a newly handed-over user is ensured in the following manners:

(a) releasing a resource occupied by accessing VUE that has a relatively low service priority in a current cell; or (b) when user priorities of the online VUE in the network are relatively high, and when sending periods of the VUE have been adjusted to a maximum service packet transmission period, automatically adjusting, by newly added vehicle user equipment or a handed-over user, a packet transmission period to the maximum packet transmission period, and sending a service packet in a resource contention manner, where a V2X QoS mechanism needs to be defined, to ensure access and refusal of a user.

In the foregoing embodiments, the first VUE further determines whether resource utilization in the $Qi^{th}$ resource pool scheduling allocation period is greater than the utilization threshold of congestion control, and if the resource utilization is greater than the utilization threshold of congestion control, sends congestion status information to the base station. Specifically, physical resource block (PRB) resource utilization of a PC5 interface is a basis for determining congestion. In the embodiments of the present invention, the following two manners are used to measure and determine whether congestion occurs on the PC5 interface.

In a first manner, the first VUE determines whether energy of each physical resource block PRB at each transmission time interval TTI or energy in a particular frequency domain is greater than an energy detection threshold, and if a ratio of a total quantity of PRBs whose energy is greater than the energy detection threshold of congestion control in a measurement period to a total quantity of PRBs in the measurement period is greater than a preset threshold, determines that utilization of a resource pool is greater than the utilization threshold of congestion control.

Specifically, a listening window size is 1000 ms according to a standard sensing mechanism, and a maximum transmission delay of a V2V service packet is 100 ms. Therefore, the PRB resource utilization of the PC5 interface is measured in the measurement period. There are two measurement manners based on resource pool division:

(a) When a scheduling allocation resource pool and a data resource pool are transmitted discontinuously based on frequency division (on a same subframe or different subframes), energy detection is performed on only the data resource pool.

(b) When a scheduling allocation resource pool and a data resource pool are continuous on a same subframe in a frequency domain, energy detection is performed on the scheduling allocation resource pool and the data resource pool in all frequency domains.

$$PRB(S_{th}) = \frac{\sum_0^{T_m-1} (1 \forall S_{avg-prb} > S_{th})}{\sum_0^{T_m-1} N_{PRB}},$$

$S_{th}$ indicates an energy demodulation threshold;

$\Sigma_0^{T_m-1} N_{PRB}$ indicates a total quantity of PRBs on a frequency band that require energy detection in a measurement period $T_m$, $N_{PRB}$ indicates a total quantity of PRBs that require energy detection at each TTI; and $\Sigma_0^{T_m-1}(1 \forall S_{vg-prb} > S_{th})$ indicates a total quantity of PRBs that are on a frequency band in the measurement period $T_m$ and for which detected energy is greater than the energy threshold $S_{th}$, and $S_{avg-prb}$ indicates energy measured on each PRB or average energy measured on PRBs on each subband.

In a second manner, the first VUE determines whether average energy of physical resource blocks PRBs in a subband PRB group in a measurement period is greater than an energy detection threshold; and if a ratio of a total quantity of PRBs whose energy is greater than the energy detection threshold of congestion control in the measurement period to a total quantity of PRBs in the measurement period is greater than a preset threshold, determines that utilization of a resource pool is greater than the utilization threshold of congestion control.

Specifically, to calculate the PRB utilization of the PC5 interface more accurately, based on energy detection and correct demodulation of a scheduling allocation resource pool, whether a data resource pool is reused is calculated, and a reused frequency band resource in the data resource pool is used to calculate the PRB utilization.

$$PRB(S_{th}) = \frac{\sum_{0}^{T_{m}-1} (N_{PRB\_SA\_NotoorectDomodu\_DATA} \vee S_{avg-prb} > s_{th})}{\sum_{0}^{T_{m}-1} N_{PRB}} +$$

$$\frac{\sum_{0}^{T_{m}-1} (S_{avg-prb} > s_{th}) \vee (N_{PRB\_SA\_NotoorectDomodu\_DATA})}{\sum_{0}^{T_{m}-1} N_{PRB}},$$

where
$\Sigma_{0}^{T_{m}-1} (N_{PRB\_SA\_NotoorectDo\ mod\ u\_DATA} \vee S_{avg-prb} > S_{th})$ indicates a quantity of PRBs that are in a total quantity of PRBs on a frequency band that require energy detection in a measurement period $T_m$, that are in the data resource pool when the scheduling allocation resource pool is demodulated incorrectly, and whose energy meets the energy detection threshold; and the energy detection threshold may be energy measured based on each PRB at each TTI or average energy measured based on PRBs on each subband; and
$\Sigma_{0}^{T_{m}-1} (S_{avg-prb} > S_{th}) \vee (N_{PRB\_SA\_NotoorectDo\ mod\ u\_DATA})$ indicates a quantity of PRBs that are in the total quantity of PRBs on the frequency band that require energy detection in the measurement period $T_m$, that are corresponding to the data resource pool frequency domain when the scheduling allocation resource pool is demodulated correctly, and whose energy meets the energy detection threshold; and the energy detection threshold may be energy measured based on each PRB at each TTI or average energy measured based on PRBs on each subband.

The foregoing content is descriptions about primary centralized congestion control performed by the base station and secondary assistance congestion control performed by the VUE in an IC scenario. The following describes in detail decentralized congestion control performed by VUE in an OOC scenario.

Specifically, when PRB resource utilization of a PC5 interface is greater than a threshold ($Thr_{UpLimit}$), it indicates that the PC5 interface is in a congestion status.

When the PRB resource utilization of the PC5 interface is less than a threshold ($Thr_{DownLimit}$), it indicates that the PC5 interface is not in the congestion status.

Values of the low threshold ($Thr_{DownLimit}$) and the high threshold ($Thr_{UpLimit}$) are 60% and 90%, respectively, and may be set based on a background parameter.

Step 1: (a) When the PRB resource utilization of the PC5 interface is greater than the high threshold ($Thr_{UpLimit}$) of congestion control, the following is performed: determine whether a proportion of correct demodulation of the VUE in all resource pool scheduling allocation periods in a measurement period meets a threshold. The threshold is set to 0 by default and may be adjusted.

If the proportion of correct demodulation≥the threshold is met, the VUE generates a random number within a range [0, N] by using a random function (RAND), and performs in every 100 ms: the random number within a range=the random number within a range−1.

The VUE adaptively adjusts a value of N based on a packet transmission period at an application layer of the VUE:

When the packet transmission period of the VUE ranges from 100 ms to 200 ms, N=2.

When the packet transmission period of the VUE ranges from 200 ms to 300 ms, N=4.

When the packet transmission period of the VUE ranges from 400 ms to 500 ms, N=6.

When the random number is equal to 0, the packet transmission period of the VUE is increased, for example, increased by 100 ms.

A new packet transmission period is a minimum of an increased packet transmission period and a maximum packet transmission period, and the maximum packet transmission period is set to 500 ms by default.

When the PRB resource utilization of the PC5 interface is less than the low threshold ($Thr_{DownLimit}$), step 2 is performed.

Step 2: When the PRB resource utilization of the PC5 interface is less than the low threshold ($Thr_{DownLimit}$) of congestion control, the following is performed:

The VUE generates a random number within a range [0, M] by using a random function RAND; and performs in every 100 ms: the random number within a range=the random number within a range−1.

The VUE adaptively adjusts a value of M based on a packet transmission period at an application layer of the VUE:

When the packet transmission period of the VUE ranges from 400 ms to 500 ms, M=2.

When the packet transmission period of the VUE ranges from 200 ms to 300 ms, M=4.

When the packet transmission period of the VUE ranges from 100 ms to 200 ms, M=6.

When the random number within a range is equal to 0, the packet transmission period of the VUE is decreased, for example, decreased by 100 ms.

A new packet transmission period is a minimum of a decreased packet transmission period and 100 ms.

An initial value of a variable is equal to 0.

100 ms indicates a minimum packet transmission period of the VUE.

When the PRB resource utilization of the PC5 interface ranges between the low threshold ($Thr_{DownLimit}$) and the high threshold ($Thr_{UpLimit}$), step 3 is performed.

Step 3: When the PRB resource utilization of the PC5 interface ranges between the thresholds [$Thr_{DownLimit}$, $Thr_{UpLimit}$] of congestion control, the congestion control reaches a balanced status, and a period of the VUE is not adjusted.

Step 4 is performed.

Step 4: Terminate a congestion control procedure in the measurement period.

Figure 9:
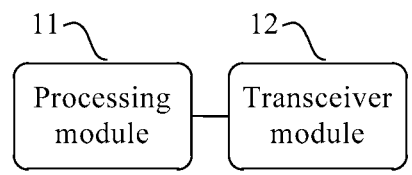
FIG. 9 is a schematic structural diagram of a base station according to an embodiment of the present invention.

FIG. 9 is a schematic structural diagram of a base station according to an embodiment of the present invention. The base station provided in this embodiment may implement all steps of the method that is provided in any embodiment of the present invention and that is applied to the base station. Specifically, the base station provided in this embodiment includes:

a processing module 11, configured to: determine to perform congestion control on user equipment UE in coverage of the base station, determine a congestion control policy, and determine first UE from the UE in the coverage of the base station, where the first UE is UE for which congestion needs to be alleviated according to the congestion control policy; and a transceiver module 12, configured to send indication information to the first UE, where the indication information carries the congestion control policy, so that the first UE performs adjustment according to the congestion control policy.

After determining that congestion control needs to be performed, the base station provided in this embodiment of the present invention determines the congestion control policy, determines, from the UE in the coverage of the base station, the first UE that needs to perform adjustment according to the congestion control policy, and then sends the congestion control policy to the first UE, so that the first UE performs adjustment, to alleviate a congestion status of a PC5 interface. In this process, the base station performs centralized control on all UE in the coverage of the base station. This resolves a problem of a poor security assistance effect caused by a decentralized congestion control policy in 802.11P. In other words, the base station performs centralized congestion control, improving a security assistance effect of a vehicle.

Optionally, in an embodiment of the present invention, the processing module 11 is specifically configured to: determine whether a quantity of transmission times of the UE in the coverage of the base station meets a preset quantity of transmission times; if the preset quantity of transmission times is met, determine whether the UE in the coverage of the base station meets a congestion control condition; and if the congestion control condition is met, determine to perform congestion control on the UE in the coverage of the base station.

Optionally, in an embodiment of the present invention, the congestion control condition includes a first condition and/or a second condition.

Under the first condition, a sum of resource requirements of the UE in the coverage of the base station is greater than resources that can be used for direct communication between UEs in the UE in the coverage of the base station.

Under the second condition, a transmission delay of at least one of the UE in the coverage of the base station is greater than a congestion control delay threshold.

Optionally, in an embodiment of the present invention, the congestion control policy is specifically used to instruct the first UE to perform adjustment in a measurement period, the measurement period includes Q resource pool scheduling allocation periods, a $Qi^{th}$ resource pool scheduling allocation period is any one of the Q resource pool scheduling allocation periods, $Q \geq 1$, $1 \leq Qi \leq Q$, and both Q and Qi are integers.

Optionally, in an embodiment of the present invention, processing module 11 is specifically configured to: when the congestion control policy is specifically used to instruct the first UE to adjust a current packet transmission period to a first packet transmission period in the measurement period, determine the first packet transmission period based on a quantity of UE that is authorized for scheduling in a scheduling queue and a quantity of UE that is unauthorized for scheduling in the scheduling queue, where the first packet transmission period is greater than the current packet transmission period, and UE in the scheduling queue is UE corresponding to the measurement period; and determine, by the base station, a quantity of the first UE for the $Qi^{th}$ resource pool scheduling allocation period based on a quantity of UE that is authorized for scheduling in the scheduling queue, a quantity of UE that is unauthorized for scheduling in the scheduling queue, and a quantity of UE whose transmission delay is greater than the congestion control delay threshold.

Optionally, in an embodiment of the present invention, the processing module 11 is further configured to: determine that resource utilization in the $Qi^{th}$ resource pool scheduling allocation period is less than a resource utilization threshold of congestion control; determine a second packet transmission period, where the second packet transmission period is less than a current packet transmission period of second UE; and determine the second UE from the scheduling queue, where the second UE is UE with a high priority in the scheduling queue.

The transceiver module 12 is further configured to send indication information to the second UE, to instruct the second UE to adjust the current packet transmission period to the second packet transmission period.

Optionally, in an embodiment of the present invention, the processing module 11 is specifically configured to: when the congestion control policy is specifically used to instruct the first UE to adjust a current packet transmission period to a first packet transmission period in the measurement period, determine, by the base station, the first packet transmission period and a quantity of the first UE for the $Qi^{th}$ resource pool scheduling allocation period, where the first packet transmission period is an integral multiple of a packet transmission period of UE whose packet transmission period is minimum in the $Qi^{th}$ resource pool scheduling allocation period.

Optionally, in an embodiment of the present invention, the processing module 11 is further configured to: determine that resource utilization in the $Qi^{th}$ resource pool scheduling allocation period is less than a resource utilization threshold of congestion control; determine a second packet transmission period, where the second packet transmission period is less than a current packet transmission period of second UE; and determine the second UE from a scheduling queue, where the second UE is UE with a high priority in the scheduling queue.

The transceiver module 12 is further configured to send indication information to the second UE, to instruct the second UE to adjust the current packet transmission period to the second packet transmission period.

Optionally, in an embodiment of the present invention, the processing module 11 is specifically configured to: when the congestion control policy is specifically used to instruct the base station to determine, based on a quantity of first UE whose transmission delay is greater than the congestion control delay threshold in a current measurement period, a quantity of first UE whose transmission delay is greater than the congestion control delay threshold in a next measurement period, determine, by the base station, a first quantity for a $Qi^{th}$ resource pool scheduling allocation period of the current measurement period, where the first quantity is a quantity of first UE whose transmission delay is greater than the congestion control delay threshold in the $Qi^{th}$ resource pool scheduling allocation period of the current measurement period; and determine, by the base station, a second quantity for a $Qi^{th}$ resource pool scheduling allocation period of the next measurement period based on the first quantity, where the second quantity is a final quantity of first UE whose transmission delay is greater than the congestion control delay threshold in the $Qi^{th}$ resource pool scheduling allocation period of the next measurement period.

Optionally, in an embodiment of the present invention, the processing module 11 is specifically configured to determine an original quantity for the $Qi^{th}$ resource pool scheduling allocation period of the next measurement period, where the original quantity is an original quantity of first UE whose transmission delay is greater than the congestion control delay threshold in the $Qi^{th}$ resource pool scheduling allocation period of the next measurement period, and the second quantity is equal to a sum of the first quantity and the original quantity.

Optionally, in an embodiment of the present invention, the processing module 11 is further configured to: determine that resource utilization in the $Qi^{th}$ resource pool scheduling allocation period of the measurement period is less than a resource utilization threshold of congestion control; and decrease the first quantity.

Optionally, in an embodiment of the present invention, the processing module 11 is further configured to instruct the second quantity of first UE to alternately serve as UE whose transmission delay is greater than the congestion control delay threshold.

Optionally, in an embodiment of the present invention, the processing module 11 is further configured to determine that handed-over UE or new accessing UE serves as the first UE, where a quantity of times that the handed-over UE or the new accessing UE serves as the first UE is a maximum or an average quantity of times that the second quantity of UE serves as the first UE.

Optionally, in an embodiment of the present invention, the processing module 11 is further configured to instruct the first UE to send a service packet by using a Uu interface, where the Uu interface is an air interface used for wireless communication between the base station and the first UE.

Optionally, in an embodiment of the present invention, the congestion control policy is specifically used to instruct the first UE to adjust transmit power, or perform adaptive modulation and coding AMC or multicarrier load balancing.

Optionally, in an embodiment of the present invention, the transceiver module 12 is specifically configured to send the indication information to the first UE by using downlink control information DCI or radio resource control RRC signaling.

Optionally, in an embodiment of the present invention, the processing module 11 is specifically configured to: when the congestion control policy is specifically used to instruct the first UE to adjust a current packet transmission period to a first packet transmission period in the measurement period, determine to adjust a current packet transmission period of each UE in the coverage of the base station to the first packet transmission period.

The transceiver module 12 is specifically configured to send the indication information to the first UE by using a system information block SIB, where the first UE is any UE in the coverage of the base station.

Optionally, in an embodiment of the present invention, the transceiver module 12 is further configured to receive congestion status information, reported by UE included in the scheduling queue, of a PC5 interface.

The processing module 11 is specifically configured to determine, based on the congestion status information of the PC5 interface, the first UE from the UE included in the scheduling queue.

Figure 10:
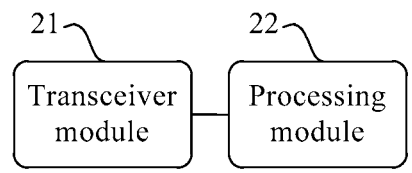
FIG. 10 is a schematic structural diagram of user equipment according to an embodiment of the present invention.

FIG. 10 is a schematic structural diagram of user equipment according to an embodiment of the present invention. The user equipment provided in this embodiment may implement all steps of the method that is provided in any embodiment of the present invention and that is applied to the user equipment. Specifically, the user equipment provided in this embodiment includes:

a transceiver module 21, configured to receive indication information sent by a base station, where the indication information carries a congestion control policy, and the congestion control policy is determined by the base station after the base station determines that congestion control needs to be performed on UE in coverage of the base station; and a processing module 22, configured to perform adjustment according to the congestion control policy.

The user equipment provided in this embodiment of the present invention receives the indication information that carries the congestion control policy and that is sent by the base station, and performs adjustment according to the congestion control policy, to alleviate a congestion status of a PC5 interface. In this process, the base station performs centralized control on all UE in the coverage of the base station. This resolves a problem of a poor security assistance effect caused by a decentralized congestion control policy in 802.11P. In other words, the base station performs centralized congestion control, improving a security assistance effect of a vehicle.

Optionally, in an embodiment of the present invention, the transceiver module 21 is further configured to send a scheduling request.

The processing module 22 is further configured to: when determining that the base station does not respond to the scheduling request after a timer expires, or determining that a PC5 interface of first UE is congested, assist in congestion control.

Optionally, in an embodiment of the present invention, the processing module 22 is specifically configured to perform at least one of the following congestion control assistance behavior:

first behavior: adjusting a packet transmission period and/or scheduling a sending period of an allocation request;

second behavior: detecting whether the timer expires and requesting a resource in a resource contention manner if the timer expires;

third behavior: sending congestion status information of the PC5 interface to the base station; or fourth behavior: serving as UE whose transmission delay is greater than a congestion control delay threshold, and discarding, by the first UE, a service packet.

Optionally, in an embodiment of the present invention, the congestion control policy is specifically used to instruct the first UE to perform adjustment in a measurement period, the measurement period includes Q resource pool scheduling allocation periods, a $Qi^{th}$ resource pool scheduling allocation period is any one of the Q resource pool scheduling allocation periods, $Q \geq 1$, $1 \leq Qi \leq Q$, and both Q and Qi are integers.

Optionally, in an embodiment of the present invention, the processing module 22 is specifically configured to: when the congestion control policy is specifically used to instruct the first UE to adjust a current packet transmission period to a first packet transmission period in the measurement period, adjust, by the first UE, the current packet transmission period to the first packet transmission period for the $Qi^{th}$ resource pool scheduling allocation period, where the first packet transmission period is greater than the current packet transmission period.

Optionally, in an embodiment of the present invention, the processing module 22 is further configured to adjust the first packet transmission period to a second packet transmission period, where the second packet transmission period is less than the first packet transmission period.

Optionally, in an embodiment of the present invention, the transceiver module 21 is specifically configured to receive DCI information sent by the base station, where the DCI information is used to instruct the first UE to serve as UE whose transmission delay is greater than a congestion control delay threshold.

Optionally, in an embodiment of the present invention, the processing module 22 is further configured to determine whether resource utilization in the measurement period is greater than a utilization threshold of congestion control.

The transceiver module 21 is further configured to send the congestion status information to the base station when the processing module 22 determines that the resource utilization in the measurement period is greater than the utilization threshold of congestion control.

Optionally, in an embodiment of the present invention, the processing module 22 is specifically configured to: determine whether energy of each physical resource block PRB at each transmission time interval TTI in the measurement period is greater than an energy detection threshold; and if a ratio of a total quantity of PRBs whose energy is greater than the energy detection threshold of congestion control in the measurement period to a total quantity of PRBs in the measurement period is greater than a preset threshold, determine that utilization of a resource pool is greater than the utilization threshold of congestion control.

Optionally, in an embodiment of the present invention, the processing module 22 is specifically configured to: determine whether average energy of physical resource blocks PRBs in a subband PRB group in the measurement period is greater than an energy detection threshold; and if a ratio of a total quantity of PRBs whose energy is greater than the energy detection threshold of congestion control in the measurement period to a total quantity of PRBs in the measurement period is greater than a preset threshold, determine that utilization of a resource pool is greater than the utilization threshold of congestion control.

Optionally, in an embodiment of the present invention, the transceiver module 21 is specifically configured to receive the indication information sent by the base station by using downlink control information DCI, radio resource control RRC signaling, or a system information block SIB.

Figure 11:
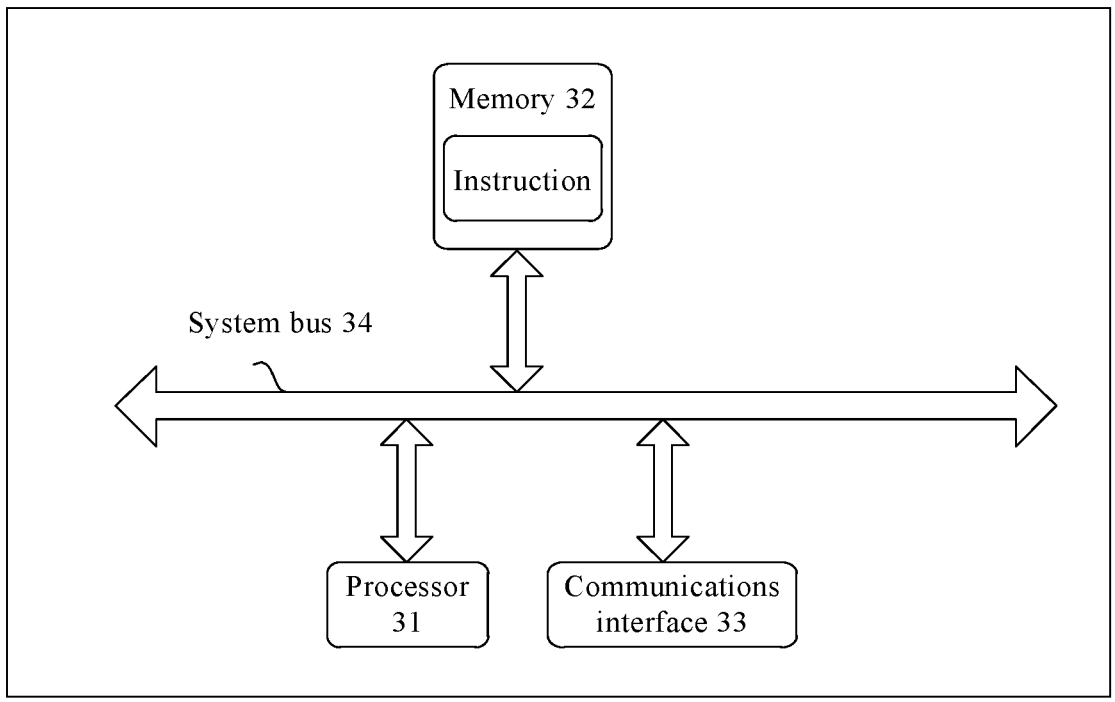
FIG. 11 is a schematic structural diagram of a base station according to another embodiment of the present invention.

FIG. 11 is a schematic structural diagram of a base station according to another embodiment of the present invention. The base station provided in this embodiment includes a processor 31, a memory 32, a communications interface 33, and a system bus 34. The memory 32 and the communications interface 33 are connected to the processor 31 by using the system bus 34 to complete communication between each other. The memory 32 is configured to store a computer executable instruction. The communications interface 33 is configured to communicate with another device. The processor 31 is configured to run the computer executable instruction, so that the base station performs all steps of the foregoing method that is applied to the base station.

Figure 12:
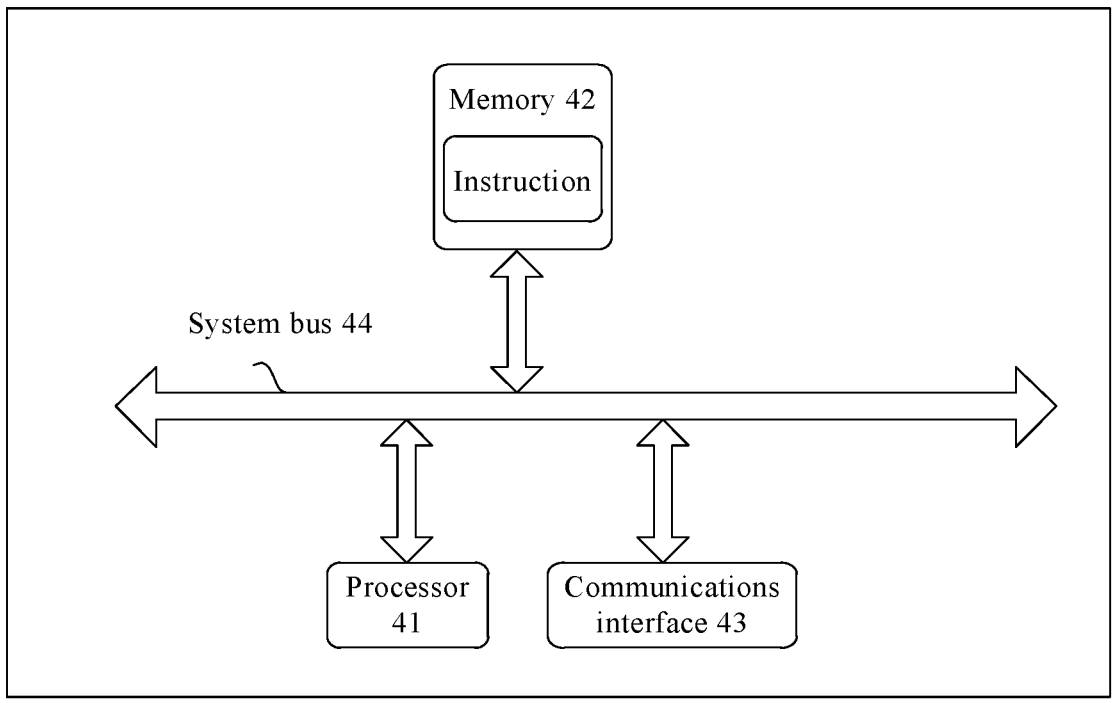
FIG. 12 is a schematic structural diagram of user equipment according to another embodiment of the present invention.

FIG. 12 is a schematic structural diagram of user equipment according to another embodiment of the present invention. The user equipment provided in this embodiment includes a processor 41, a memory 42, a communications interface 43, and a system bus 44. The memory 42 and the communications interface 43 are connected to the processor 41 by using the system bus 44 to complete communication between each other. The memory 42 is configured to store a computer executable instruction. The communications interface 43 is configured to communicate with another device. The processor 41 is configured to run the computer executable instruction, so that the user equipment performs all steps of the foregoing method that is applied to the user equipment.

The system bus mentioned in FIG. 11 and FIG. 12 may be a peripheral component interconnect (peripheral component interconnect, PCI) bus, an extended industry standard architecture (extended industry standard architecture, EISA) bus, or the like. The system bus may be classified into an address bus, a data bus, a control bus, and the like. For ease of representation, only one bold line is used to represent the bus in the figure, but this does not mean that there is only one bus or only one type of bus. The communications interface is configured to implement communication between a database accessing apparatus and another device (such as a client, a read/write database, or a read-only database). The memory may include a random access memory (RAM), or may further include a non-transitory memory, for example, at least one magnetic disk storage.

The processor may be a general processor, including a central processing unit (CPU), a network processor (NP), or the like; or may be a digital signal processor (DSP), an application-specific integrated circuit (ASIC), a field-programmable gate array (FPGA) or another programmable logic device, a discrete gate or transistor logic device, or a discrete hardware component.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A congestion control method, comprising:
    determining, by first user equipment (UE), whether resource utilization in a measurement period is greater than a utilization threshold of congestion control;
    if the resource utilization is greater than the utilization threshold of congestion control, sending, by the first UE, congestion status information to a base station;
    receiving, by the first UE, indication information sent by the base station, wherein the indication information carries a congestion control policy, wherein the congestion control policy is determined by the base station after the base station determines that congestion control needs to be performed on UE in coverage of the base station, wherein the congestion control policy is used to indicate the first UE to perform adjustment in the measurement period, wherein the measurement period comprises Q resource pool scheduling allocation periods, wherein a $Qi^{th}$ resource pool scheduling allocation period is any one of the Q resource pool scheduling allocation periods, wherein Q≥1, wherein 1≤Qi≤Q, and wherein both Q and Qi are integers; and performing, by the first UE, adjustment according to the congestion control policy.

2. The method according to claim 1, further comprising:
sending, by the first UE, a scheduling request; and
in response to determining that the base station does not respond to the scheduling request after a timer expires or in response to determining that a PC5 interface of the first UE is congested, assisting, by the first UE, in congestion control.

3. The method according to claim 2, wherein the assisting, by the first UE, in congestion control comprises at least one of the following behaviors:
a first behavior, wherein the first behavior comprises at least one of the first UE adjusting a packet transmission period or the first UE scheduling a sending period of an allocation request;
a second behavior, wherein the second behavior comprises the first UE detecting whether the timer expires, and requesting a resource in a resource contention manner if the timer expires;
a third behavior, wherein the third behavior comprises the first UE sending congestion status information of the PC5 interface to the base station; or
a fourth behavior, wherein the fourth behavior comprises the first UE serving as UE whose transmission delay is greater than a congestion control delay threshold, and the first UE discarding a service packet.

4. The method according to claim 1, wherein the congestion control policy is used to indicate the first UE to adjust a current packet transmission period to a first packet transmission period in the measurement period, and wherein the performing, by the first UE, adjustment according to the congestion control policy comprises:
adjusting, by the first UE, the current packet transmission period to the first packet transmission period for the $Qi^{th}$ resource pool scheduling allocation period, wherein the first packet transmission period is greater than the current packet transmission period.

5. The method according to claim 4, further comprising:
adjusting, by the first UE, the first packet transmission period to a second packet transmission period, wherein the second packet transmission period is less than the first packet transmission period.

6. The method according to claim 1, further comprising:
receiving, by the first UE, downlink control information (DCI) information sent by the base station, wherein the DCI information is used to indicate the first UE to serve as UE whose transmission delay is greater than a congestion control delay threshold.

7. The method according to claim 1, wherein the determining, by first UE, whether resource utilization in a measurement period is greater than a utilization threshold of congestion control comprises:
determining, by the first UE, whether energy of each physical resource block (PRB) at each transmission time interval (TTI) in the measurement period is greater than an energy detection threshold; and if a ratio of a total quantity of PRBs whose energy is greater than the energy detection threshold of congestion control in the measurement period to a total quantity of PRBs in the measurement period is greater than a preset threshold, determining that utilization of a resource pool is greater than the utilization threshold of congestion control.

8. The method according to claim 1, wherein the determining, by first UE, whether resource utilization in a measurement period is greater than a utilization threshold of congestion control comprises:
determining, by the first UE, whether average energy of physical resource blocks (PRBs) in a subband PRB group in the measurement period is greater than an energy detection threshold; and
if a ratio of a total quantity of PRBs whose energy is greater than the energy detection threshold of congestion control in the measurement period to a total quantity of PRBs in the measurement period is greater than a preset threshold, determining that utilization of a resource pool is greater than the utilization threshold of congestion control.

9. The method according to claim 1, wherein the receiving, by the first UE, indication information sent by the base station comprises:
receiving, by the first UE, the indication information sent by the base station by using downlink control information (DCI), radio resource control (RRC) signaling, or a system information block (SIB).

10. A base station comprising at least one processor, a memory, a communications interface, and a system bus, wherein the memory and the communications interface are connected to the at least one processor by using the system bus to complete communication between each other, wherein the memory is configured to store a computer executable instruction, wherein the communications interface is configured to communicate with another device, and wherein the at least one processor is configured to run the computer executable instruction to cause the base station to perform, when the computer executable instruction is executed, the following operations:
determining to perform congestion control on user equipment (UE) in coverage of the base station;
determining a congestion control policy;
determining first UE from the UE in the coverage of the base station, wherein the first UE is UE for which congestion needs to be alleviated according to the congestion control policy;
receiving congestion status information from the first UE; and
sending indication information to the first UE, wherein the indication information carries the congestion control policy, wherein the congestion control policy is used to indicate the first UE to performs adjustment in a measurement period according to the congestion control policy, wherein the measurement period comprises Q resource pool scheduling allocation periods, wherein a $Qi^{th}$ resource pool scheduling allocation period is any one of the Q resource pool scheduling allocation periods, wherein Q≥1, wherein 1≤Qi≤Q, and wherein both Q and Qi are integers.

11. User equipment (UE), wherein the UE is a first UE, wherein the first UE comprises at least one processor, a memory, a communications interface, and a system bus, wherein the memory and the communications interface are connected to the at least one processor by using the system bus to complete communication between each other, wherein the memory is configured to store a computer executable instruction, wherein the communications interface is configured to communicate with another device, and wherein the at least one processor is configured to run the computer executable instruction to cause the first UE to perform, when the computer executable instruction is executed, the following operations:
  determining whether resource utilization in a measurement period is greater than a utilization threshold of congestion control;
  if the resource utilization is greater than the utilization threshold of congestion control, sending congestion status information to a base station;
  receiving indication information sent by the base station, wherein the indication information carries a congestion control policy, wherein the congestion control policy is determined by the base station after the base station determines that congestion control needs to be performed on UE in coverage of the base station, wherein the congestion control policy is used to indicate the first UE to perform adjustment in the measurement period, wherein the measurement period comprises Q resource pool scheduling allocation periods, wherein a $Qi^{th}$ resource pool scheduling allocation period is any one of the Q resource pool scheduling allocation periods, wherein Q≥1, wherein 1≤Qi≤Q, and wherein both Q and Qi are integers; and
  performing adjustment according to the congestion control policy.

12. The UE according to claim 11, the operations further comprising:
  sending a scheduling request; and
  in response to determining that the base station does not respond to the scheduling request after a timer expires or in response to determining that a PC5 interface of the first UE is congested, assisting in congestion control.

13. The UE according to claim 12, wherein the assisting in congestion control comprises at least one of the following behaviors:
  a first behavior, wherein the first behavior comprises at least one of the first UE adjusting a packet transmission period or the first UE scheduling a sending period of an allocation request;
  a second behavior, wherein the second behavior comprises the first UE detecting whether the timer expires, and requesting a resource in a resource contention manner if the timer expires;
  a third behavior, wherein the third behavior comprises the first UE sending congestion status information of the PC5 interface to the base station; or
  a fourth behavior, wherein the fourth behavior comprises the first UE serving as UE whose transmission delay is greater than a congestion control delay threshold, and the first UE discarding a service packet.

14. The UE according to claim 11, wherein the congestion control policy is used to indicate the first UE to adjust a current packet transmission period to a first packet transmission period in the measurement period, and wherein the performing adjustment according to the congestion control policy comprises:
  adjusting the current packet transmission period to the first packet transmission period for the $Qi^{th}$ resource pool scheduling allocation period, wherein the first packet transmission period is greater than the current packet transmission period.

15. The UE according to claim 14, the operations further comprising:
  adjusting the first packet transmission period to a second packet transmission period, wherein the second packet transmission period is less than the first packet transmission period.

16. The UE according to claim 11, the operations further comprising:
  receiving downlink control information (DCI) information sent by the base station, wherein the DCI information is used to indicate the first UE to serve as UE whose transmission delay is greater than a congestion control delay threshold.

17. The UE according to claim 11, wherein the determining whether resource utilization in a measurement period is greater than a utilization threshold of congestion control comprises:
  determining whether energy of each physical resource block (PRB) at each transmission time interval (TTI) in the measurement period is greater than an energy detection threshold; and
  if a ratio of a total quantity of PRBs whose energy is greater than the energy detection threshold of congestion control in the measurement period to a total quantity of PRBs in the measurement period is greater than a preset threshold, determining that utilization of a resource pool is greater than the utilization threshold of congestion control.

18. The UE according to claim 11, wherein the determining whether resource utilization in a measurement period is greater than a utilization threshold of congestion control comprises:
  determining whether average energy of physical resource blocks (PRBs) in a subband PRB group in the measurement period is greater than an energy detection threshold; and
  if a ratio of a total quantity of PRBs whose energy is greater than the energy detection threshold of congestion control in the measurement period to a total quantity of PRBs in the measurement period is greater than a preset threshold, determining that utilization of a resource pool is greater than the utilization threshold of congestion control.

19. The UE according to claim 11, wherein the receiving indication information sent by the base station comprises:
  receiving the indication information sent by the base station by using downlink control information (DCI), radio resource control (RRC) signaling, or a system information block (SIB).

* * * * *